(12) United States Patent
Tabata et al.

(10) Patent No.: US 12,522,902 B2
(45) Date of Patent: Jan. 13, 2026

(54) JOINT COMPONENT AND MANUFACTURING METHOD THEREOF

(71) Applicant: NIPPON STEEL CORPORATION, Tokyo (JP)

(72) Inventors: Shinichiro Tabata, Tokyo (JP); Kazuhisa Kusumi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 656 days.

(21) Appl. No.: 17/798,271

(22) PCT Filed: Feb. 12, 2021

(86) PCT No.: PCT/JP2021/005292
§ 371 (c)(1),
(2) Date: Aug. 8, 2022

(87) PCT Pub. No.: WO2021/162101
PCT Pub. Date: Aug. 19, 2021

(65) Prior Publication Data
US 2023/0103935 A1 Apr. 6, 2023

(30) Foreign Application Priority Data
Feb. 13, 2020 (JP) .................................. 2020-022754

(51) Int. Cl.
*C22C 38/54* (2006.01)
*B23K 11/00* (2006.01)
(Continued)

(52) U.S. Cl.
CPC .......... *C22C 38/54* (2013.01); *B23K 11/0026* (2013.01); *B23K 11/11* (2013.01);
(Continued)

(58) Field of Classification Search
CPC ............ B23K 11/0026; B23K 11/0033; B23K 13/015; B23K 2101/18
See application file for complete search history.

(56) References Cited

U.S. PATENT DOCUMENTS

2009/0302094 A1 12/2009 Milam
2012/0141829 A1* 6/2012 Oikawa .................. B23K 11/16
219/118
(Continued)

FOREIGN PATENT DOCUMENTS

JP 2002-102980 A 4/2002
JP 2004-2932 A 1/2004
(Continued)

OTHER PUBLICATIONS

Yun et al., "Improvement of resistance spot weldability of Al—Fe-alloy-coated HPF steel sheets", Science and Technology of Welding and Joining, vol. 27, No. 6, 2022 (Published online Apr. 11, 2022), pp. 429-436, XP93020661.

*Primary Examiner* — Ricardo D Morales
(74) *Attorney, Agent, or Firm* — Birch, Stewart, Kolasch & Birch, LLP

(57) ABSTRACT

This joint component is a joint component including a first steel member, a second steel member, and a spot-welded portion that joins the first steel member and the second steel member, in which the first steel member includes a steel sheet substrate having a predetermined chemical composition and a coating that is formed on a surface of the steel sheet substrate, contains Al and Fe, and has a thickness of 25 μm or more, in a cross section in a thickness direction of the first steel member and the second steel member including the spot-welded portion, a filled metal containing Al and Fe is present in a gap between the first steel member and the second steel member in a periphery of the spot-welded portion, in the cross section, the filled metal has a cross- (Continued)

sectional area of $3.0 \times 10^4$ μm² or more, and has a filling ratio of 80% or more in the gap in a range of 100 μm from an end portion of a corona bond formed in the periphery of the spot-welded portion, and includes a first region and a second region.

6 Claims, 1 Drawing Sheet

(51) Int. Cl.

| | |
|---|---|
| *B23K 11/11* | (2006.01) |
| *B23K 11/16* | (2006.01) |
| *B23K 11/24* | (2006.01) |
| *B23K 101/18* | (2006.01) |
| *B23K 101/34* | (2006.01) |
| *B23K 103/04* | (2006.01) |
| *C22C 38/42* | (2006.01) |
| *C22C 38/44* | (2006.01) |
| *C22C 38/46* | (2006.01) |
| *C22C 38/50* | (2006.01) |
| *C23C 2/26* | (2006.01) |

(52) U.S. Cl.
CPC ............ *B23K 11/163* (2013.01); *B23K 11/24* (2013.01); *C22C 38/42* (2013.01); *C22C 38/44* (2013.01); *C22C 38/46* (2013.01); *C22C 38/50* (2013.01); *C23C 2/26* (2013.01); *B23K 2101/18* (2018.08); *B23K 2101/34* (2018.08); *B23K 2103/04* (2018.08)

(56) References Cited

U.S. PATENT DOCUMENTS

| | | | |
|---|---|---|---|
| 2015/0001188 A1 | 1/2015 | Oikawa et al. | |
| 2017/0081741 A1 | 3/2017 | Tabata et al. | |
| 2017/0081742 A1 | 3/2017 | Tabata et al. | |

FOREIGN PATENT DOCUMENTS

| | | |
|---|---|---|
| JP | 2006-212649 A | 8/2006 |
| JP | 2011-167742 A | 9/2011 |
| JP | 2012-1802 A | 1/2012 |
| JP | 2012-180594 A | 9/2012 |
| WO | WO 2015/182591 A1 | 12/2015 |
| WO | WO 2015/182596 A1 | 12/2015 |
| WO | WO 2019/003447 A1 | 1/2019 |

\* cited by examiner

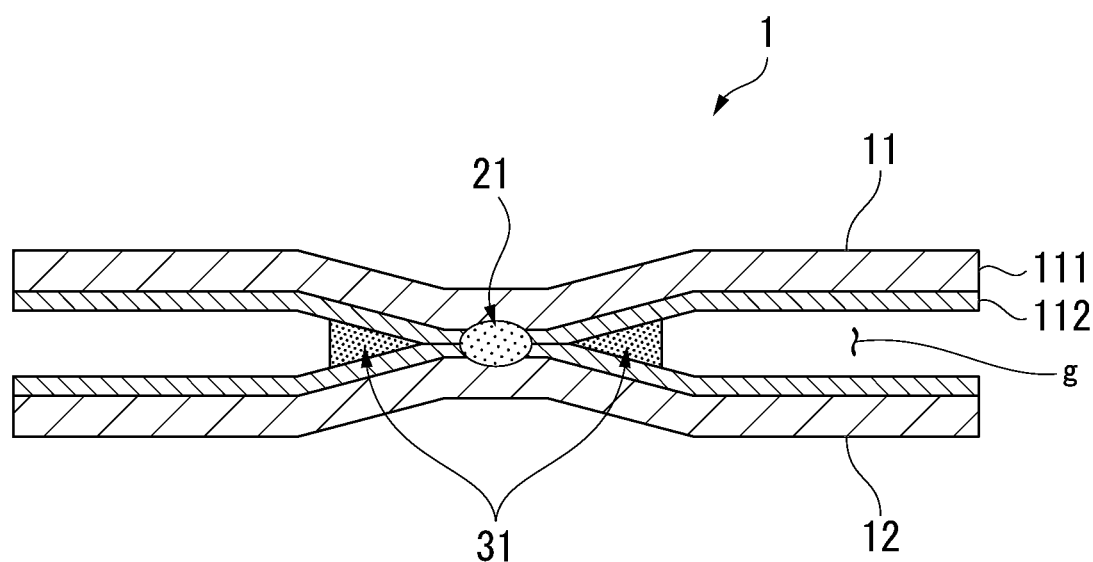

JOINT COMPONENT AND MANUFACTURING METHOD THEREOF

TECHNICAL FIELD OF THE INVENTION

The present invention relates to a joint component and a manufacturing method thereof.

Priority is claimed on Japanese Patent Application No. 2020-022754, filed Feb. 13, 2020, the content of which is incorporated herein by reference.

RELATED ART

In the automotive field, in order to improve both fuel consumption and collision safety against the background of recent stringent environmental regulations and collision safety standards, the application of a steel sheet having high tensile strength (high-strength steel sheet) has expanded. However, the press formability of the steel sheet decreases with high-strengthening, thereby making it difficult to manufacture the steel sheet into a product having a complex shape.

Specifically, the ductility of the steel sheet decreases with high-strengthening, and the steel sheet is fractured at a highly processed portion when the steel sheet is processed into a complex shape, which is a problem. Furthermore, with the high-strengthening of the steel sheet, the residual stress after processing causes springback and wall warpage, and the dimensional accuracy deteriorates, which is a problem. Therefore, it is not easy to process a steel sheet having high strength, particularly a tensile strength of 780 MPa or more, into a product having a complex shape by press-forming. Roll forming makes it easier to process a high-strength steel sheet than press forming, but is limited to being applied to components each having a uniform cross section in a longitudinal direction.

Therefore, in recent years, for example, as disclosed in Patent Documents 1 to 3, a hot stamping technique has been adopted as a technique of press-forming a material that is difficult to form, for example, a high-strength steel sheet. The hot stamping technique is a hot forming technique of heating a material provided for forming and then of forming the material.

In this technique, the material is heated and then formed. Therefore, during forming, the steel is soft and has good formability. Accordingly, even a steel sheet having high strength can be accurately formed into a complex shape. Furthermore, in the hot stamping technique, since quenching is performed simultaneously with forming by a press die, a steel member obtained after forming has sufficient strength.

For example, Patent Document 1 discloses that a steel member having a tensile strength of 1,400 MPa or more can be obtained after forming by the hot stamping technique.

In recent years, countries around the world have set higher $CO_2$ reduction targets, and each vehicle manufacturer has progressed in reducing fuel consumption in consideration of collision safety. Not only gasoline vehicles but also electric vehicles that are under rapid progress require, as its materials, high-strength materials that protect not only passengers but also batteries from collision and that cancel out the amount of an increase in weight. For example, in a steel member that is in use for vehicles and the like, a hot stamping member that has a higher strength than a strength that is commonly used as a steel member formed by hot stamping at present, that is, more than 1.5 GPa (1500 MPa), is required.

However, most of metal materials deteriorate in various properties with high-strengthening and particularly, the hydrogen embrittlement susceptibility increases. It is known that the hydrogen embrittlement susceptibility increases when the tensile strength of a steel member is 1.2 GPa or more, and there is a case of hydrogen embrittlement cracking in bolt steel for which high-strengthening has been progressed ahead of the automotive field. Therefore, in the hot stamping member having a tensile strength of more than 1.5 GPa, a further increase in the hydrogen embrittlement susceptibility is concerned.

In steel members that are in use for vehicles, there is a risk that hydrogen embrittlement cracking may be caused due to hydrogen that is generated from the corrosion of a steel while vehicles are in operation. As described above, since the hydrogen embrittlement susceptibility of a steel extremely increases particularly in a strength range of more than 1.5 GPa, it is considered that the steel may hydrogen-embrittle due to a trace amount of hydrogen generated by slight corrosion. However, vehicle design that completely prevents corrosion of a steel is difficult. Therefore, in order to apply the hot stamping member having a strength of more than 1.5 GPa to the vehicle body for a further reduction in the weight of the vehicle body, a risk of hydrogen embrittlement cracking needs to be sufficiently reduced.

A point where, particularly, hydrogen embrittlement is concerned while vehicles are in operation is a spot-welded portion. There are three main reasons for the spot-welded portion to be particularly prone to hydrogen embrittlement. Specifically, the spot-welded portion is likely to hydrogen-embrittle due to the facts that (i) corrosion is likely to progress in the spot-welded portion, (ii) stress is generated in the spot-welded portion when a component having poor dimensional accuracy is welded or the like, and (iii) the structure of a melted and solidified portion such as the spot-welded portion is coarse and likely to embrittle. That is, in the spot-welded portion, all of the generation of hydrogen, the application of stress, and the limit of the material, which are the causes of hydrogen embrittlement, are under stricter conditions than those in stationary portions of the base metal.

As a supplement to the reason (i), since the effect of a chemical conversion treatment and painting is unlikely to reach a portion where steel sheets (or members) are over-lapped and welded, and the presence of a gap caused by dimensional defects makes corrosion progress locally, a large amount of hydrogen is generated (gap corrosion reaction).

Regarding a high-strength steel having a tensile strength of more than 1.5 GPa, for example, Patent Document 2 discloses a press-formed article that has excellent toughness and a tensile strength of 1.8 GPa or more and that is hot press-formed. Patent Document 3 discloses a steel having an extremely high tensile strength of 2.0 GPa or more and, furthermore, having good toughness and ductility. Patent Document 4 discloses a steel having a high tensile strength of 1.8 GPa or more and, furthermore, having good toughness. Patent Document 5 discloses a steel having an extremely high tensile strength of 2.0 GPa or more and, furthermore, having good toughness.

However, in Patent Documents 2 to 5, regarding hydrogen embrittlement resistance, measures against hydrogen embrittlement in a spot-welded portion where embrittlement is concerned particularly in a corrosive environment are not sufficient. Therefore, the steels of Patent Documents 2 to 5 have a tensile strength of more than 1.5 GPa, but do not sufficiently satisfy safer requirements in some cases when used as vehicle members.

Regarding high-strength steels having a spot-welded portion, for example, Patent Documents 6 to 8 disclose spot welding methods in which electrode contamination or welding dust generation in an aluminum-plated steel sheet is suppressed.

However, in all of the patent documents, measures against hydrogen embrittlement in the spot-welded portion of the high-strength steel are not sufficient, and a requirement for higher safety may not be sufficiently satisfied in the application of the high-strength steel having a tensile strength of more than 1.5 GPa to vehicle members.

PRIOR ART DOCUMENT

Patent Document

[Patent Document 1] Japanese Unexamined Patent Application, First Publication No. 2002-102980
[Patent Document 2] Japanese Unexamined Patent Application, First Publication No. 2012-180594
[Patent Document 3] Japanese Unexamined Patent Application, First Publication No. 2012-1802
[Patent Document 4] PCT International Publication No. WO2015/182596
[Patent Document 5] PCT International Publication No. WO2015/182591
[Patent Document 6] Japanese Unexamined Patent Application, First Publication No. 2006-212649
[Patent Document 7] Japanese Unexamined Patent Application, First Publication No. 2011-167742
[Patent Document 8] Japanese Unexamined Patent Application, First Publication No. 2004-2932

DISCLOSURE OF THE INVENTION

Problems to be Solved by the Invention

The present invention has been made to solve the above problems, and an object of the present invention is to provide a joint component having a spot-welded portion having excellent hydrogen embrittlement resistance in a corrosive environment and a manufacturing method thereof.

Means for Solving the Problem

The gist of the present invention is the following joint component and manufacturing method thereof.

(1) A joint component according to one aspect of the present invention is a joint component including a first steel member, a second steel member, and a spot-welded portion that joins the first steel member and the second steel member, in which the first steel member includes a steel sheet substrate containing, as a chemical composition, by mass %, C: 0.25% to 0.65%, Si: 0.10% to 1.00%, Mn: 0.30% to 1.50%, P: 0.050% or less, S: 0.0100% or less, N: 0.010% or less, Ti: 0.010% to 0.100%, B: 0.0005% to 0.0100%, Mo: 0% to 1.00%, Cu: 0% to 1.00%, Ni: 0% to 1.00%, Cr: 0% to 1.00%, Nb: 0% to 0.10%, V: 0% to 1.00%, Ca: 0% to 0.010%, Al: 0% to 1.00%, Sn: 0% to 1.00%, W: 0% to 1.00%, Sb: 0% to 1.00%, Zr: 0% to 1.00%, REM: 0% to 0.30%, and a remainder of Fe and an impurity and a coating that is formed on a surface of the steel sheet substrate, contains Al and Fe, and has a thickness of 25 μm or more, in a cross section in a thickness direction of the first steel member and the second steel member including the spot-welded portion, a filled metal containing Al and Fe is present in a gap between the first steel member and the second steel member in a periphery of the spot-welded portion, in the cross section, the filled metal has a cross-sectional area of $3.0 \times 10^4$ μm$^2$ or more and has a filling ratio of 80% or more in the gap in a range of 100 μm from an end portion of a corona bond formed in the periphery of the spot-welded portion, and the filled metal includes a first region containing, by mass %, Al: 15% or more and less than 35%, Fe: 55% or more and 75% or less, and Si: 4% or more and 9% or less and a second region containing, by mass %, Al: 35% or more and 55% or less, Fe: 40% or more and less than 55%, and Si: 1% or more and less than 4%.

(2) In the joint component according to (1) above, the steel sheet substrate of the first steel member may contain, as the chemical composition, by mass %, one or more of Mo: 0.10% to 1.00%, Cu: 0.10% to 1.00%, and Ni: 0.10% to 1.00%, the first region may further contain one or more of Mo, Cu, and Ni in a total content of 0.25% or more, and the second region may further contain one or more of Mo, Cu, and Ni in a total content of 0.15% or more.

(3) In the joint component according to (2) above, an average of Feret diameters of the second region may be set to 30 μm or less.

(4) A manufacturing method of a joint component according to another aspect of the present invention includes a heat treatment step of heating a coated steel sheet including a steel sheet containing, as a chemical composition, by mass %, C: 0.25% to 0.65%, Si: 0.10% to 1.00%, Mn: 0.30% to 1.50%, P: 0.050% or less, S: 0.0100% or less, N: 0.010% or less, Ti: 0.010% to 0.100%, B: 0.0005% to 0.0100%, Mo: 0% to 1.00%, Cu: 0% to 1.00%, Ni: 0% to 1.00%, Cr: 0% to 1.00%, Nb: 0% to 0.10%, V: 0% to 1.00%, Ca: 0% to 0.010%, Al: 0% to 1.00%, Sn: 0% to 1.00%, W: 0% to 1.00%, Sb: 0% to 1.00%, Zr: 0% to 1.00%, REM: 0% to 0.30%, and a remainder of Fe and an impurity and a coating that is formed on a surface of the steel sheet, contains Al, and has an adhesion amount of 50 g/m$^2$ or more to an Ac3 point to (Ac3 point+300°) C. at a temperature rising rate of 1.0 to 1,000° C./s and cooling the coated steel sheet to an Ms point or lower at an upper critical cooling rate or faster to obtain a steel member and a spot-welding step of joining the steel member after the heat treatment step and a second steel member that serves as an opposite material by spot welding, in which, in the spot-welding step, at least at a position where an energizing electrode is pressed, the steel member and the second steel member are disposed so as to overlap each other with a gap of 50 μm to 500 μm therebetween, the energizing electrode is pressed against the steel member and the second steel member such that a contact angle is 15 degrees or less and an electrode force is 300 kgf or more, 5 or more cycles of upslope in which an energizing amount is gradually increased is imparted with a 50 Hz or 60 Hz alternating source, and then a weld nugget is formed to join the steel member and the second steel member.

(5) In the manufacturing method of a joint components according to (4) above, the chemical composition of the steel sheet may contain, by mass %, one or more of Mo: 0.10% to 1.00%, Cu: 0.10% to 1.00%, and Ni: 0.10% to 1.00%.

(6) In the manufacturing method of a joint component according to (5) above, in the spot-welding step, an average cooling rate from 800° C. to 500° C. may be set to 500° C./s or faster.

Effects of the Invention

According to the aspect of the present invention, it is possible to provide a joint component having a spot-welded portion having excellent hydrogen embrittlement resistance in a corrosive environment and a manufacturing method thereof.

The joint component according to the aspect of the present invention has high strength and excellent hydrogen embrittlement resistance and thus contributes to improvement in fuel consumption and collision safety when being applied to a vehicle component.

BRIEF DESCRIPTION OF THE DRAWINGS

FIG. 1 is a schematic view showing one example of a joint component according to the present embodiment.

EMBODIMENTS OF THE INVENTION

In order to obtain a joint component having a spot-welded portion having high tensile strength and excellent hydrogen embrittlement resistance in a corrosive environment, the present inventors investigated the influences of the structure of a weld or a steel that serves as a material on these properties. As a result, the following findings were obtained.

Most of materials to be used for hot stamping members that are commonly manufactured are coated steel sheets of which a surface is subjected to an aluminum plating having excellent corrosion resistance. When hot stamping is performed on this coated steel sheet, an alloying reaction between Al in a plating layer on the surface and Fe in the steel sheet progresses during heating, and a steel member including a coating containing Al and Fe (coated steel member) (hereinafter, referred to as the Al—Fe-based coating in some cases) is obtained. Most of commonly used steel sheets showing a tensile strength of about 1.5 GPa after hot stamping contain about 0.20 mass % of C, and the strength after the hot stamping is secured due to C. This steel member is joined to another member by spot welding, whereby a joint component can be obtained.

(a) In order to achieve a further reduction in the weight of the vehicle body, the present inventors conducted a detailed study for obtaining a high strength member that has a tensile strength of more than 1.5 GPa (1500 MPa) after hot stamping by means of an increase in the C content. As a result, it was found that, in terms of tensile strength, an ultrahigh strength of more than 1.5 GPa could be obtained after a heat treatment including quenching such as hot stamping by setting the C content to 0.25 mass % or more. On the other hand, there was a concern about a risk that hydrogen embrittlement susceptibility increased with ultrahigh-strengthening to a tensile strength of more than 1.5 GPa and hydrogen embrittlement cracking was caused by hydrogen generated in a corrosive environment while vehicles were in operation. In particular, when a joint component was produced using this coated steel member, since a spot-welded portion was melted once, corrosion resistance by aluminum plating could not be guaranteed, and a risk of hydrogen embrittlement was concerned.

(b) The present inventors studied a method for suppressing hydrogen embrittlement by preventing corrosion of a spot-welded portion, which acts as a starting point of embrittlement, in a joint component made of a coated steel member having a high strength of more than 1.5 GPa and an Al—Fe-based coating. As a result, it was found that corrosion can be sufficiently prevented by covering the periphery of a weld with an alloy containing Al and Fe.

(c) The present inventors further investigated the hydrogen embrittlement resistance of a coated steel member having a tensile strength of more than 1.5 GPa and found component design or structure design that was excellent in terms of hydrogen embrittlement resistance.

Based on the above findings, the present inventors developed a joint component made of a high-strength coated steel member having a tensile strength of more than 1.5 GPa in which the hydrogen embrittlement resistance in a corrosive environment is significantly improved by preventing corrosion of a spot-welded portion, reducing the amount of hydrogen intrusion, and improving the hydrogen embrittlement resistance of a steel. Such a joint component has a high strength and a low risk of hydrogen embrittlement and thus can be applied to vehicle bodies more safely.

Hereinafter, each requirement of a joint component according to one embodiment of the present invention (the joint component according to the present embodiment) and a manufacturing method thereof will be described in detail.

(A) Joint Component

As shown in FIG. 1, a joint component 1 according to the present embodiment includes a first steel member 11, a second steel member 12, and a spot-welded portion 21 that joins the first steel member 11 and the second steel member 12. This first steel member 11 is a coated steel member having a steel sheet substrate 111 having a predetermined chemical composition and a coating (Al—Fe-based coating) 112 that is formed on the surface of the steel sheet substrate 111 and contains Al and Fe.

Furthermore, in the joint component 1 according to the present embodiment, in a cross section in the thickness direction of the first steel member 11 and the second steel member 12 including the spot-welded portion 21, a filled metal 31 containing Al and Fe is present in a gap g between the first steel member 11 and the second steel member 12 in the periphery of the spot-welded portion 21. The filled metal 31 includes a first region containing, by mass %, Al: 15% or more and less than 35%, Fe: 55% or more and 75% or less, and Si: 4% or more and 9% or less and a second region containing, by mass %, Al: 35% or more and 55% or less, Fe: 40% or more and less than 55%, and Si: 1% or more and less than 4%.

Furthermore, in the cross section, the filled metal 31 has a cross-sectional area of $3.0 \times 10^4$ μm$^2$ or more and has a filling ratio of 80% or more in the gap g in a range of 100 μm from the end portion of a corona bond formed in the periphery of the spot-welded portion 21.

Hereinafter, each will be described below.

(A1) First Steel Member

As described above, the first steel member 11 included in the joint component 1 according to the present embodiment has the steel sheet substrate 111 and the coating (Al—Fe-based coating) 112 that is formed on the surface of the steel sheet substrate 111 and contains Al and Fe.

As described below, the first steel member 11 is obtained by performing a heat treatment accompanying quenching such as hot stamping on a coated steel sheet having a steel sheet substrate and an Al-based coating.

(A1-1) Steel Sheet Substrate

The steel sheet substrate 111 of the first steel member 11 included in the joint component 1 according to the present embodiment has a predetermined chemical composition. Specifically, the steel sheet substrate 111 has a chemical composition containing, by mass %, C: 0.25% to 0.65%, Si: 0.10% to 1.00%, Mn: 0.30% to 1.50%, P: 0.050% or less, S: 0.0100% or less, N: 0.010% or less, Ti: 0.010% to 0.100%, B: 0.0005% to 0.0100%, Mo: 0% to 1.00%, Cu: 0% to 1.00%, Ni: 0% to 1.00%, Cr: 0% to 1.00%, Nb: 0% to 0.10%, V: 0% to 1.00%, Ca: 0% to 0.010%, Al: 0% to 1.00%, Sn: 0% to 1.00%, W: 0% to 1.00%, Sb: 0% to 1.00%, Zr: 0% to 1.00%, REM: 0% to 0.30%, and a remainder of Fe and an impurity.

The reasons for limiting each element are as follows. Here, the chemical composition of the steel sheet substrate 111 refers to the chemical composition of a portion of the first steel member 11 excluding the Al—Fe-based coating 112 on the surface (for example, a ¼ position of the thickness from the surface of the steel sheet substrate). Hereinafter, % regarding the content is mass % unless otherwise specified.

C: 0.25% to 0.65%

C is an element that enhances the hardenability of steel and increases the strength of the steel member that is obtained after quenching such as hot stamping. When the C content is less than 0.25%, it becomes difficult to secure sufficient strength (more than 1.5 GPa) in the steel member after quenching. Therefore, the C content is set to 0.25% or more. The C content is preferably 0.28% or more.

On the other hand, when the C content is more than 0.65%, the strength of the steel member after quenching becomes too high, and deterioration of the hydrogen embrittlement resistance becomes significant. Therefore, the C content is set to 0.65% or less. The C content is preferably 0.60% or less.

Si: 0.10% to 1.00%

Si is an element that is effective in enhancing the hardenability of steel and in stably securing the strength of the steel member after quenching. In order to obtain this effect, the Si content needs to be set to 0.10% or more. The Si content is preferably 0.35% or more.

On the other hand, when the Si content in steel is more than 1.00%, a heating temperature required for austenitic transformation becomes significantly high during the heat treatment (quenching). Accordingly, the cost required for the heat treatment may increase, or ferrite may remain during heating and the strength of the steel member decreases. Therefore, the Si content is set to 1.00% or less. The Si content is preferably 0.60% or less.

Mn: 0.30% to 1.50%

Mn is an element that is very effective in enhancing the hardenability of steel and in stably securing the strength after quenching. Furthermore, Mn is an element that lowers an Ac3 point and promotes the lowering of the quenching treatment temperature. However, when the Mn content is less than 0.30%, the effect is not sufficient. Therefore, the Mn content is set to 0.30% or more. The Mn content is preferably 0.40% or more.

On the other hand, when the Mn content is more than 1.50%, the hydrogen embrittlement resistance of the steel member after quenching deteriorates. Therefore, the Mn content is set to 1.50% or less. The Mn content is preferably 1.30% or less and more preferably 1.10% or less.

P: 0.050% or less

P is an element that degrades the hydrogen embrittlement resistance of the steel member after quenching. In particular, when the P content is more than 0.050%, deterioration of the hydrogen embrittlement resistance becomes significant. Therefore, the P content is limited to 0.050% or less. The P content is preferably limited to 0.005% or less.

Since it is preferable that the P content is small, the P content may be 0%. However, the P content may be set to 0.001% or more from the viewpoint of cost.

S: 0.0100% or less

S is an element that degrades the hydrogen embrittlement resistance of the steel member after quenching. In particular, when the S content is more than 0.0100%, deterioration of the hydrogen embrittlement resistance becomes significant. Therefore, the S content is limited to 0.0100% or less. The S content is preferably limited to 0.0050% or less. Since it is preferable that the S content is small, the S content may be 0%. However, the S content may be set to 0.0001% or more from the viewpoint of cost.

N: 0.010% or less

N is an element that degrades the hydrogen embrittlement resistance of the steel member after quenching. In particular, when the N content is more than 0.010%, coarse nitrides are formed in steel, and the hydrogen embrittlement resistance significantly deteriorates. Therefore, the N content is set to 0.010% or less. A lower limit of the N content does not have to be particularly limited and may be 0%. However, setting the N content to less than 0.0002% leads to an increase in steelmaking cost and is economically undesirable. Therefore, the N content may be set to 0.0002% or more or 0.0008% or more.

Ti: 0.010% to 0.100%

Ti is an element having an action of refining austenite grains by suppressing recrystallization and by suppressing grain growth by means of the formation of fine carbides when the steel sheet is subjected to a heat treatment by being heated to a temperature of the Ac3 point or higher. Therefore, an effect of increasing the hydrogen embrittlement resistance of the steel member can be obtained by containing Ti. Furthermore, Ti is an element that is preferentially bonded to N in the steel to suppress the consumption of B caused by the precipitation of BN and to promote an effect of enhancing the hardenability induced by B to be described below. When the Ti content is less than 0.010%, the above effects cannot be sufficiently obtained. Therefore, the Ti content is set to 0.010% or more. The Ti content is preferably 0.015% or more.

On the other hand, when the Ti content is more than 0.100%, the amount of precipitation of TiC increases and C is consumed, so that the strength of the steel member after quenching decreases. Therefore, the Ti content is set to 0.100% or less. The Ti content is preferably 0.080% or less.

B: 0.0005% to 0.0100%

B is an important element having an action of dramatically enhancing the hardenability of steel even with a trace amount. Furthermore, B is an element that is segregated at grain boundaries to strengthen the grain boundaries and to improve the hydrogen embrittlement resistance, and that suppresses the growth of austenite grains when the steel sheet is heated. When the B content is less than 0.0005%, the above effects may not be sufficiently obtainable. Therefore, the B content is set to 0.0005% or more. The B content is preferably 0.0010% or more.

On the other hand, when the B content is more than 0.0100%, a large amount of coarse compounds are precipitated, and the hydrogen embrittlement resistance of the steel member deteriorates. Therefore, the B content is set to 0.0100% or less. The B content is preferably 0.0080% or less.

In the chemical composition of the steel sheet substrate 111 included in the first steel member 11 included in the joint component of the present embodiment, elements other than the above elements, that is, the remainder may be Fe and an impurity, but one or more elements selected from the group consisting of Mo, Cu, Ni, Cr, Nb, V, Ca, Al, Sn, W, Sb, Zr, and REM may be contained within ranges described below in order to improve various properties (hardenability, strength, hydrogen embrittlement resistance, deoxidation properties, corrosion resistance, and the like) of the steel member and the joint component including this steel member. These elements are optional elements and do not necessarily have to be contained.

Therefore, the lower limit thereof is 0%.

Mo: 0% to 1.00%

Mo is an element that is very effective in enhancing the hardenability of steel and in stably securing the strength of the steel member after quenching. In particular, a synergistic effect of improving the hardenability can be obtained by containing Mo and B simultaneously. Furthermore, Mo is capable of further improving the corrosion resistance by being contained in a filled metal (Al—Fe-based filled metal) that is formed in the periphery of the spot-welded portion. Therefore, Mo is preferably contained. When the Mo content is less than 0.10%, since these effects are not sufficient, the Mo content is preferably set to 0.10% or more and more preferably set to 0.20% or more.

On the other hand, Mo has an action of stabilizing iron carbides. When the Mo content is more than 1.00%, coarse iron carbides may remain undissolved when the steel sheet is heated, and the hydrogen embrittlement resistance of the steel member after quenching may deteriorate. In addition, the cost increase is significant. Therefore, in the case of containing Mo, the Mo content is set to 1.00% or less. The Mo content is preferably 0.80% or less.

Cu: 0% to 1.00%

Cu is an element that is effective in enhancing the hardenability of steel and in stably securing the strength of the steel member after quenching. Furthermore, Cu is an element that further improves the corrosion resistance by being contained in an Al—Fe-based filled metal that is formed in the periphery of the spot-welded portion, which will be described below. Therefore, Cu is preferably contained. When the Cu content is less than 0.10%, since these effects are not sufficient, in the case of containing Cu, the Cu content is preferably set to 0.10% or more. The Cu content is more preferably 0.20% or more.

On the other hand, when the Cu content is more than 1.00%, the above effects are saturated and the cost increases. Therefore, in the case of containing Cu, the Cu content is set to 1.00% or less. The Cu content is preferably 0.80% or less.

Ni: 0% to 1.00%

Ni is an element that is effective in enhancing the hardenability of steel and in stably securing the strength of the steel member after quenching. Furthermore, Ni is an element that further improves the corrosion resistance by being contained in an Al—Fe-based filled metal that is formed in the periphery of the spot-welded portion. Therefore, Ni is preferably contained. When the Ni content is less than 0.10%, since these effects are not sufficient, in the case of containing Ni, the Ni content is preferably set to 0.10% or more. The Ni content is more preferably 0.20% or more.

On the other hand, when the Ni content is more than 1.00%, the critical hydrogen amount of the steel member decreases. In addition, the cost increase is significant. Therefore, in the case of containing Ni, the Ni content is set to 1.00% or less. The Ni content is preferably 0.25% or less and more preferably 0.20% or less.

Cr: 0% to 1.00%

Cr is an element that is effective in enhancing the hardenability of steel and in stably securing the strength of the steel member after quenching. Therefore, Cr may be contained. In order to obtain the above effects, the Cr content is preferably 0.01% or more, more preferably 0.05% or more, and even more preferably 0.08% or more.

On the other hand, when the Cr content is more than 1.00%, the above effects are saturated and the cost increases. Furthermore, since Cr has an action of stabilizing iron carbides, when the Cr content is more than 1.00%, coarse iron carbides may remain undissolved when the steel sheet is heated, and the hydrogen embrittlement resistance of the steel member after quenching may deteriorate. Therefore, in the case of containing Cr, the Cr content is set to 1.00% or less. The Cr content is preferably 0.80% or less.

Nb: 0% to 0.10%

Nb is an element having an action of forming fine carbides and of increasing the hydrogen embrittlement resistance of steel by means of the refining effect. When the Nb content is less than 0.02%, the above effects may be not sufficiently obtainable. Therefore, in order to obtain the above effects, the Nb content is preferably set to 0.02% or more. The Nb content is more preferably 0.03% or more.

On the other hand, when the Nb content is more than 0.10%, the carbides become coarse and the hydrogen embrittlement resistance of the steel member deteriorates. Therefore, in the case of containing Nb, the Nb content is set to 0.10% or less. The Nb content is preferably 0.08% or less.

V: 0% to 1.00%

V is an element that forms fine carbides and improves the hydrogen embrittlement resistance of the steel member by means of the refining effect or hydrogen trapping effect. Therefore, V may be contained. In order to obtain the above effects, the V content is preferably set to 0.01% or more and more preferably set to 0.10% or more.

On the other hand, when the V content is more than 1.00%, the above effects are saturated and the economic efficiency decreases. Therefore, in the case of containing V, the V content is set to 1.00% or less.

Ca: 0% to 0.010%

Ca is an element having an effect of refining inclusions in steel and of improving the hydrogen embrittlement resistance of the steel member after quenching. Therefore, Ca may be contained. In order to obtain the above effect, the Ca content is preferably set to 0.001% or more and more preferably set to 0.002% or more.

On the other hand, when the Ca content is more than 0.010%, the effect is saturated and the cost increases. Therefore, in the case of containing Ca, the Ca content is set to 0.010% or less. The Ca content is preferably 0.005% or less and more preferably 0.004% or less.

Al: 0% to 1.00%

Al is an element commonly used as a steel deoxidizing agent. Therefore, Al may be contained. In order to obtain the above effect, the Al content is preferably set to 0.01% or more.

On the other hand, when the Al content is more than 1.00%, the above effect is saturated and the economic efficiency decreases. Therefore, in the case of containing Al, the Al content is set to 1.00% or less.

Sn: 0% to 1.00%

Sn is an element that improves the corrosion resistance in a corrosive environment. Therefore, Sn may be contained. In order to obtain the above effect, the Sn content is preferably set to 0.01% or more.

On the other hand, when the Sn content is more than 1.00%, the grain boundary strength decreases, and the hydrogen embrittlement resistance of the steel member after quenching deteriorates. Therefore, in the case of containing Sn, the Sn content is set to 1.00% or less.

W: 0% to 1.00%

W is an element that is effective in enhancing the hardenability of steel and in stably securing the strength of the steel member after quenching. Therefore, W may be contained. Furthermore, W is an element that improves the corrosion resistance in a corrosive environment. In order to obtain the above effects, the W content is preferably set to 0.01% or more.

On the other hand, when the W content is more than 1.00%, the above effects are saturated and the economic efficiency decreases. Therefore, in the case of containing W, the W content is set to 1.00% or less.

Sb: 0% to 1.00%

Sb is an element that improves the corrosion resistance in a corrosive environment. Therefore, Sb may be contained. In order to obtain the above effect, the Sb content is preferably set to 0.01% or more.

On the other hand, when the Sb content is more than 1.00%, the grain boundary strength decreases, and the hydrogen embrittlement resistance of the steel member after quenching deteriorates. Therefore, in the case of containing Sb, the Sb content is set to 1.00% or less.

Zr: 0% to 1.00%

Zr is an element that improves the corrosion resistance in a corrosive environment. Therefore, Zr may be contained. In order to obtain the above effect, the Zr content is preferably set to 0.01% or more.

On the other hand, when the Zr content is more than 1.00%, the grain boundary strength decreases, and the hydrogen embrittlement resistance of the steel member after quenching deteriorates. Therefore, in the case of containing Zr, the Zr content is set to 1.00% or less.

REM: 0% to 0.30%

Similar to Ca, REM is an element having an effect of refining inclusions in steel and of improving the hydrogen embrittlement resistance of the steel member after quenching. Therefore, REM may be contained. In order to obtain the above effects, the REM content is preferably set to 0.01% or more and more preferably set to 0.02% or more.

On the other hand, when the REM content is more than 0.30%, the effect is saturated and the cost increases. Therefore, in the case of containing REM, the REM content is set to 0.30% or less. The REM content is preferably 0.20% or less.

Here, REM refers to a total of 17 elements including Sc, Y, and lanthanoids such as La and Nd, and the REM content means the total content of these elements. REM is added to molten steel using, for example, a Fe—Si-REM alloy, and this alloy contains, for example, La, Nd, Ce, and Pr.

In the chemical composition of the steel sheet substrate 111 included in the first steel member 11 included in the joint component of the present embodiment, elements other than the above elements, that is, the remainder may be Fe and an impurity.

Here, the "impurity" is a component that is mixed because of various factors including raw materials such as ore and scrap and a manufacturing step when the steel sheet is industrially manufactured, and are acceptable in a range without adversely affecting the properties of the joint component according to the present embodiment.

The chemical composition of the steel sheet substrate 111 can be obtained by the following method.

The chemical composition can be obtained by averaging contents obtained by performing elemental analysis using a general method such as ICP from a ¼ position of the sheet thickness from the surface of the steel sheet substrate 111 in the sheet thickness direction.

Internal Structure of Steel Sheet Substrate 111

The internal structure (metallographic structure) of the steel sheet substrate 111 included in the first steel member 11 included in the joint component 1 according to the present embodiment is a structure primarily containing martensite having high strength. Preferably, martensite occupies 70% or more in terms of area fraction. More preferably, martensite occupies 80% or more. Martensite may occupy 100%.

The internal structure of the steel sheet substrate 111 may contain one or more of residual austenite, bainite, ferrite, and pearlite as the remainder other than martensite. Martensite includes not only fresh martensite but also tempered martensite and auto-tempered martensite. The auto-tempered martensite is tempered martensite formed during cooling at the time of quenching without a heat treatment for tempering, and is formed by in-situ tempering of martensite formed due to self-heating associated with martensitic transformation.

The internal structure of the steel sheet substrate 111 can be determined by the following method.

The area fraction of martensite (including tempered martensite and auto-tempered martensite) is measured by a transmission electron microscope (TEM) and an electron beam diffractometer attached to the TEM. Measurement samples are cut out from a ¼ portion of the sheet width of the steel member (a ¼ position of the sheet width in the width direction from an end portion in the width direction) and a thickness ¼ portion of the steel sheet substrate 111 (a ¼ position of the sheet thickness in the sheet thickness direction from the surface) and used as thin film samples for TEM observation. As the thin film sample, a sample cut out from a cross section in the direction orthogonal to the rolling direction is used. Furthermore, the range of TEM observation is set to a range of 400 μm$^2$ in terms of area. The electron beam diffraction pattern of the thin film sample makes it possible to distinguish between martensite or bainite, which has body-centered cubic lattices, and residual austenite, which has face-centered cubic lattices. Then, iron carbides ($Fe_3C$) in martensite and bainite are found by the diffraction pattern, and the precipitation morphology thereof is observed to measure the microstructural fractions of martensite and bainite. Specifically, regarding the precipitation morphology, precipitation in three directions is determined to be martensite, and precipitation limited to one direction is determined to be bainite. The microstructural fractions of martensite and bainite measured by the TEM are measured in area %; however, since the metallographic structure of the steel member of the present embodiment has isotropy, the values of the area fractions can be directly replaced into volume fractions. Carbides are observed to distinguish between martensite and bainite, but in the present embodiment, carbides are not included in the volume fraction of the structure.

Ferrite or pearlite that may be present as the remainder in microstructure can be easily confirmed with an optical microscope or a scanning electron microscope. Specifically, measurement samples are cut out from a sheet width ¼ portion of the steel member and a thickness ¼ portion of the steel sheet substrate and used as samples for observation. As the sample, a sample cut out from a cross section in the direction orthogonal to the rolling direction is used. Furthermore, the observation range of the microscope is set to a range of 40,000 μm$^2$ in terms of area. The cut samples are mechanically polished and then mirror-finished. Next, etching is performed with a nital etching solution to reveal ferrite and pearlite, and the cut sample is observed with the microscope to confirm the presence of ferrite or pearlite. A structure in which ferrite and cementite are alternately arranged in layers is distinguished to be pearlite, and a structure in which cementite is precipitated in particles is distinguished to be bainite.

(A1-2) Coating

The first steel member 11 included in the joint component according to the present embodiment has the coating 112 containing Al and Fe (Al—Fe-based coating) on the surface of the steel sheet substrate 111 described above. In the present embodiment, the Al—Fe-based coating is a coating primarily containing Al and Fe, and preferably contains Al and Fe in a total amount of 70 mass % or more. Furthermore, the Al—Fe-based coating is also referred to as a coating, an alloy plating layer, or an intermetallic compound layer. In the Al—Fe-based coating, in addition to Al and Fe, Si, Mg, Ca, Sr, Ni, Cu, Mo, Mn, Cr, C, Nb, Ti, B, V, Sn, W, Sb, Zr, REM, and Zn may be further contained and the remainder may be impurities.

The thickness of the Al—Fe-based coating is preferably 25 μm or more. The upper limit of the thickness of the Al—Fe-based coating is not particularly limited and may be set to 100 μm or less.

The chemical composition and thickness of the Al—Fe-based coating can be obtained by the observation of the cross section using the scanning electron microscopic and an electron probe micro-analyzer (EPMA). 10 visual fields are observed, and the chemical composition and thickness of the coating are obtained using the average values.

(A2) Second Steel Member

In the joint component 1 according to the present embodiment, the second steel member 12 joined to the first steel member 11 through the spot-welded portion 21 is not particularly limited from the viewpoint of the hydrogen embrittlement resistance of the spot-welded portion 21. However, when the corrosion resistance of the joint component 1 is taken into account, the second steel member 12 is preferably, similar to the first steel member 11, a coated steel member having an Al—Fe-based coating.

(A3) Weld

The joint component 1 according to the present embodiment has a joint portion by spot welding (spot-welded portion 21), and the first steel member 11 and the second steel member 12 are joined through the spot-welded portion 21. The spot-welded portion 21 is made of a nugget formed by spot welding. A corona bond (a ring-shaped solid-phase joined portion) may be formed in the periphery of the nugget. The size of the nugget of the spot-welded portion 21 of the joint component 1 according to the present embodiment is not particularly limited; however, when the sheet thickness is defined as t (mm), the size is preferably $3 \times \sqrt{t}$ (mm) or more in the direction parallel to the sheet surface.

(A4) Filled Metal

The joint component 1 according to the present embodiment has the filled metal 31 containing Al and Fe in the periphery of the spot-welded portion 21 described above. That is, in a cross section in the thickness direction of the first steel member 11 and the second steel member 12 including the spot-welded portion 21, the filled metal 31 containing Al and Fe is present between the first steel member 11 and the second steel member 12 in the periphery of the spot-welded portion 21 (for example, an end portion of the nugget or a position within a range of 100 μm or less from an end portion of a corona bond when the corona bond is formed).

In the joint component 1 according to the present embodiment, as described below, the first steel member 11 and the second steel member 12 are disposed so as to overlap each other with a gap of 50 μm to 500 μm therebetween, an energizing electrode is pressed against the first steel member 11 and the second steel member 12 such that the contact angle is 15 degrees or less and the electrode force is 300 kgf or more to perform spot welding, and the first steel member and the second steel member are joined together. Therefore, in the joint component 1 according to the present embodiment, as shown in FIG. 1, while the first steel member 11 and the second steel member 12 are in contact with each other in the spot-welded portion 21, in the periphery thereof, the gap g is present between the first steel member 11 and the second steel member 12. The gap is filled with the filled metal 31, whereby corrosion of the spot-welded portion 21 can be suppressed, and the hydrogen embrittlement resistance improves. The filled metal 31 needs to be present so as to fill the gap g between the first steel member 11 and the second steel member 12 in order to suppress the corrosion of the spot-welded portion 21. The filled metal 31 needs to have a cross-sectional area of $3.0 \times 10^4$ μm$^2$ or more and have a filling ratio of 80% or more in a gap within a range of 100 μm from the end portion of the corona bond formed in the periphery of the spot-welded portion. The filling ratio is preferably 90% or more and may be 100%. When the cross-sectional area is small or the filling ratio is small, corrosion of the spot-welded portion cannot be sufficiently suppressed. As long as the filled metal 31 fills the gap p between the first steel member 11 and the second steel member 12 as described above in at least one cross section in the thickness direction of the first steel member 11 and the second steel member 12 including the spot-welded portion 21, the effect can be obtained, but it is preferable that the gap g is filled as described above in all cross sections because the effect becomes stronger.

The filled metal 31 includes a region having two types of chemical compositions.

A first region contains, in the chemical composition, by mass %, Al: 15% or more and less than 35%, Fe: 55% or more and 75% or less, and Si: 4% or more and 9% or less. The first region may further contain Mo, Cu, and Ni as necessary, and, in that case, the total content of Mo, Cu, and Ni is preferably set to 0.25 mass % or more.

A second region contains, in the chemical composition, by mass %, Al: 35% or more and 55% or less, Fe: 40% or more and less than 55%, and Si: 1% or more and less than 4%. The second region may further contain Mo, Cu, and Ni as necessary, and, in that case, the total content of Mo, Cu, and Ni is preferably set to 0.15 mass % or more.

Such a filled metal can be obtained by performing welding, which will be described below, on the above steel members (the first steel member 11 and the second steel member 12).

Other chemical compositions that are contained in the steel sheet substrate and the coating may also be contained as the remainder of the chemical compositions of the first region and the second region.

Further, in the filled metal 31, the second region is preferably finely dispersed. In this case, the corrosion resistance further improves. The reason therefor is considered as follows.

The second region has a larger Al content than the first region and has a stronger sacrificial protection effect than the first region. Therefore, when the filled metal is corroded, the second region is corroded preferentially over the first region. Since the second region is dispersed in the filled metal as a fine net-shape structure, the area that is preferentially corroded becomes large. Therefore, as the second region is dispersed in the filled metal more finely, the anticorrosion effect of the filled metal becomes stronger.

Specifically, the second region is preferably dispersed in a fine size of an average Feret diameter of 30 μm or less. Since the second region is dispersed in a net shape, the shape thereof is various. Therefore, the size of the second region is regulated by the Feret diameter. A measuring method of the size of the second region will be described below for the convenience of description.

The cross-sectional area and filling ratio of the filled metal 31 are obtained by the following method.

A vertical cross section passing through the central position of a welding point is cut out such that the spot-welded portion (the nugget and the corona bond) and a cross section of the filled metal in the joint component 1 can be observed, and the area of the filled metal is obtained in the cross section. A cutting method is based on, for example, JIS Z 3139: 2009. Under the welding conditions, 5 or more samples are cut out and the cross-sectional areas are obtained, and the average value is regarded as the cross-sectional area of the filled metal.

Furthermore, the proportion occupied by the filled metal in the region excluding the steel members is obtained in a range from the end of a pressure welded portion (corona bond) in the cross section to 100 μm toward the gap portion. Under the welding conditions, 5 or more samples are cut out and the proportions are obtained, and the minimum value is regarded as the filling ratio of the filled metal.

The amount of Al, Fe, Si, Mo, Cu, and Ni contained in the filled metal 31 is obtained by the following method.

A vertical cross section passing through the central position of the welding point is cut out such that a cross section of the spot-welded portion (the nugget and the corona bond) and the filled metal in the joint component 1 can be observed. A reflected electron image is acquired from this sample using a scanning electron microscope, and spot elemental analysis (beam diameter: 1 μm or less) is performed using an electron probe micro-analyzer (EPMA) on two types of structures with different contrasts that form the filled metal, whereby the amount of Al, Fe, Si, Mo, Cu, and Ni contained in the filled metal can be obtained. At the time of measurement, the analysis is performed at 10 points in each of the two types of structures in the first region that looks bright because a relatively large amount of Fe, which is a heavy element, is contained and the other second region, and the average values are regarded as the amount of Al, Fe, Si, Mo, Cu, and Ni contained in the filled metal.

The size of the second region included in the filled metal 31 is obtained by the following method.

A vertical cross section passing through the central position of the welding point is cut out such that the spot-welded portion (the nugget and the corona bond) and a cross section of the filled metal in the joint component 1 can be observed. A reflected electron image is acquired from this sample using a scanning electron microscope. As described above, the second region can be determined by the contrast. Furthermore, the size of the second region is defined as the average value of the distance between parallel lines that are lines parallel to the horizontal direction and sandwich the second region (horizontal Feret diameter) and the distance between parallel lines that are lines parallel to the vertical direction and sandwich the second region (vertical Feret diameter). The horizontal direction refers to the longitudinal direction of the joint components, and the vertical direction refers to the sheet thickness direction perpendicular to the longitudinal direction.

In the joint component according to the present embodiment, the second region often has an island-like form surrounded by the first regions. At the time of measurement, the size of the island-like second region surrounded by 15 first regions is measured, and the average value thereof is regarded as the size of the second region included in the filled metal.

(A5) Properties of Joint Component

In the joint component 1 according to the present embodiment, the filled metal 31 is controlled as described above, whereby the intrusion of a corrosion factor into the spot-welded portion 21 is reduced and corrosion is prevented. Furthermore, the joint component 1 according to the present embodiment has a high strength, that is, a tensile strength of more than 1.5 GPa, and is excellent in terms of hydrogen embrittlement resistance in a corrosive environment.

In the present embodiment, the hydrogen embrittlement resistance in a corrosive environment is evaluated by an exposure test in an environment where the joint component is actually used or a corrosion promotion test by CCT (composite cycle test). For example, CCT is performed in accordance with the provisions of JASO standards M609 and M610, and the hydrogen embrittlement resistance is evaluated by the number of cycles during which the spot-welded portion does not fracture.

The shape of the joint component 1 is not particularly limited. That is, the first steel member 11 and/or the second steel member 12 may be a flat sheet or may be a formed body. The coated steel member that has been subjected to hot forming is a formed body in many cases, and in the present embodiment, the case of a formed body and the case of a flat sheet are collectively referred to as a "coated steel member". Furthermore, the coated steel member may be a tailored property material having different strengths depending on points.

(B) Coated Steel Sheet Serving as Material

Next, the coated steel sheet that serves as a material of the first steel member (coated steel member) included in the joint component according to the present embodiment (hereinafter, referred to as a coated steel sheet according to the present embodiment in some cases) will be described. The first steel member can be obtained by performing a heat treatment using the coated steel sheet to be described below as a material of the first steel member 11. This coated steel sheet may also be used as a material of the second steel member 12.

The coated steel sheet according to the present embodiment has a steel sheet having a predetermined chemical composition and a coating that is formed on the surface of the steel sheet and contains Al (Al-based coating).

(B1) Chemical Composition of Steel Sheet

The range of a chemical composition of the steel sheet included in the coated steel sheet according to the present embodiment is the same as the chemical composition of the steel sheet substrate 111 in the first steel member 11 described above, and the reason for its limitation is also the same. Here, the chemical composition of the steel sheet refers to a chemical composition of a portion of the coated steel sheet excluding the Al-based coating of the surface and the boundary region between the Al-based coating and the steel sheet. For example, the chemical composition is obtained by taking a ¼ position of the sheet thickness in the sheet thickness direction from the surface of the steel sheet as a representative position, and by performing elemental analysis at the position using a general method such as ICP.

(B2) Coating

The coated steel sheet according to the present embodiment has the coating (hereinafter, Al-based coating) containing Al, on the surface of the steel sheet. The Al-based coating is a coating primarily containing Al, and preferably contains 40% or more of Al. The Al-based coating is also referred to as a coating or a plating layer. In addition to Al, the Al-based coating may further contain Si, Mg, Ca, Sr, Ti, Zn, Sb, Sn, Ni, Cu, Co, In, Bi, and REM, and the remainder may be impurities. Generally, the Al-based coating contains about 10 mass % of Si in many cases.

The type of the Al-based coating is not limited. For example, the coating is a coating formed by hot-dip plating, electro plating, thermal spraying, or the like.

The adhesion amount of the Al-based coating is preferably 50 g/m² or more. The upper limit of the adhesion amount of the Al-based coating is not particularly limited, but the adhesion amount may be set to 150 g/m² or less.

The chemical composition and thickness of the coating can be obtained, similar to the coating of the first steel member, by the observation of the cross section using the scanning electron microscopic and an electron probe microanalyzer (EPMA).

(B3) Internal Structure of Steel Sheet

The internal structure (metallographic structure) of the steel sheet included in the coated steel sheet according to the present embodiment is not limited, but is ferrite or pearlite in many cases. In conditions of a manufacturing method to be described below, bainite, martensite, and residual austenite may be contained. The martensite also includes tempered or auto-tempered martensite. The auto-tempered martensite is tempered martensite formed during cooling at the time of quenching without a heat treatment for tempering, and is formed by in-situ tempering of martensite formed due to heat generated in association with martensitic transformation. The internal structure of the steel sheet is a structure of the steel sheet excluding the above boundary portion.

The internal structure of the steel sheet can be determined by the same method as that of the internal structure of the steel sheet substrate described above.

(C) Manufacturing Method of Joint Component

Next, a manufacturing method of the joint component 1 according to the present embodiment will be described.

The joint component 1 according to the present embodiment is obtained by performing a heat treatment, which will be described below, on the coated steel sheet according to the present embodiment as described above to produce a steel member and then joining a plurality of steel members including this steel member by spot welding.

Hereinafter, each step will be described.

<Heat Treatment Step>

The heat treatment is performed, for example, under conditions under which the coated steel sheet obtained by the above method is heated to the Ac3 point to (Ac3 point+300°) C. at a temperature rising rate of 1.0 to 1,000° C./s and is cooled to an Ms point or lower at an upper critical cooling rate or faster.

When the temperature rising rate is slower than 1.0° C./s, the productivity of the heat treatment decreases, which is not preferable. On the other hand, when the temperature rising rate is faster than 1,000° C./s, a duplex grain structure is formed and the critical hydrogen amount decreases, which is not preferable.

Furthermore, when the heat treatment temperature is lower than the Ac3 point, ferrite remains after cooling and the strength is insufficient, which is not preferable. On the other hand, when the heat treatment temperature is higher than the Ac3 point+300° C., the structure becomes coarse and the critical hydrogen amount decreases, which is not preferable.

The upper critical cooling rate is a minimum cooling rate at which austenite is supercooled to form martensite without causing precipitation of ferrite or pearlite in the structure, and when cooling is performed at slower than the upper critical cooling rate, ferrite or pearlite is formed, and the strength is insufficient.

During heating, retention may be performed in a range of the heating temperature±10° C. for 1 to 300 seconds.

Furthermore, after cooling, a tempering treatment may be performed in a temperature range of about 100° C. to 600° C. in order to adjust the strength of the steel member.

The Ac3 point, the Ms point, and the upper critical cooling rate are measured by the following method.

Strip-shaped test pieces each having a width of 30 mm and a length of 200 mm are cut out from a steel sheet having the same chemical composition as that of the steel sheet included in the coated steel sheet according to the present embodiment, and the test pieces are heated to 1,000° C. at a temperature rising rate of 10° C./s in a nitrogen atmosphere, retained at the temperature for five minutes, and then cooled to room temperature at various cooling rates. The cooling rates are set at intervals of 10° C./s from 1° C./s to 100° C./s. By measuring a change in the thermal expansion of each of the test pieces during heating at that time, the Ac3 point is measured.

Furthermore, among the test pieces cooled at the above cooling rates, the minimum cooling rate at which ferrite is not precipitated is defined as the upper critical cooling rate. A change in thermal expansion during cooling at a cooling rate of the upper critical cooling rate or faster is measured, and the transformation start temperature at that time is regarded as the Ms point.

Here, in the series of heat treatments, hot forming such as hot stamping may be performed at the same time as while cooling to the Ms point is performed after heating in a temperature range of the Ac3 point to (Ac3 point+300°) C., that is, a cooling step is performed at the upper critical cooling rate or faster. Exemplary examples of the hot forming are bending, drawing, stretching, hole expansion, flange forming, and the like. Furthermore, the present invention may be applied to a forming method such as roll forming other than press forming as long as a device that cools the steel sheet simultaneously with or immediately after forming is provided. In a case where the thermal history described above is followed, hot forming may be repeatedly performed.

As described above, in the present embodiment, the first steel member 11 and the second steel member 12 of the "joint component 1" include both a formed body obtained by hot forming and a flat sheet obtained by performing only a heat treatment.

Furthermore, as the first steel member 11, hot forming or a heat treatment may be performed on a part of the coated steel sheet that serves as a material to obtain a coated steel member having regions having different strengths.

The series of heat treatments can be performed by any method, and may be performed by, for example, high frequency heating, energization heating, infrared heating, or furnace heating. Cooling may also be performed by water cooling, die cooling, or the like.

<Spot-Welding Step>

In a spot-welding step, at least at a position where an energizing electrode is pressed, the coated steel member that has undergone the heat treatment (first steel member) and a steel member that serves as a welding opposite material (second steel member) are disposed with a gap of 50 μm to 500 μm provided therebetween, the energizing electrode is pressed against the coated steel member and the steel member that serves as the welding opposite material such that the contact angle is 15 degrees or less and the electrode force is 300 kgf or more, 5 or more cycles of upslope in which an energizing amount is gradually increased is imparted with a 50 Hz or 60 Hz alternating source, and then a weld nugget is formed to join the coated steel member and the welding opposite material. A spot welding method, a device and an electrode therefor are not limited; however, for example, those described in JIS Z 3001-6: 2013, JIS C 9305: 2011, and JIS C 9304: 1999 may be used. When the alternating source is a single-phase AC type, the frequency is 50 Hz or 60 Hz, an electrode having a tip diameter of 6 mm or more is used, and the welding time is preferably 10 or more cycles.

Furthermore, when the distribution state of the second region in the filled metal is controlled, the cooling conditions of spot welding are preferably controlled.

Hereinafter, each condition will be described.

Gap between coated steel member and steel member that serves as opposite material: 50 μm to 500 μm In the spot welding of the joint component, the Al—Fe coating on the surface layer is melted and discharged to the periphery of the weld, whereby a filled metal is formed. At least at the position where the energizing electrode is pressed, when a gap of 50 μm or more is not provided between the coated steel member and the welding opposite material, the discharge of the molten Al—Fe alloy to the periphery of the weld is disturbed, and the cross-sectional area of the filled metal may become less than $3.0 \times 10^4$ μm$^2$, which is not preferable.

On the other hand, when the gap is more than 500 μm, the filling ratio of the filled metal may become less than 80%, which is not preferable.

Contact Angle of 15 Degrees or Less

The contact angle of the energizing electrode is the contact angle between the energizing electrode and the coated steel sheet and indicates a deviation from an angle of 0 at which the axial direction of the energizing electrode and the direction parallel to the surface of the coated steel sheet are perpendicular to each other. When the contact angle is more than 15 degrees, the discharge of the molten Al—Fe alloy to the periphery of the weld becomes nonuniform, the filled metal is not evenly formed in the periphery of the weld, and the filling ratio may become less than 80%, which is not preferable. In this case, it is not possible to sufficiently prevent corrosion and the hydrogen embrittlement resistance in a corrosive environment deteriorates, which is not preferable. The contact angle is preferably 10 degrees or less.

Electrode Force of 300 Kgf or More

When a pressure is applied between welding electrodes, the Al—Fe-based coating comes into contact with the welding opposite material, and the Al—Fe-based alloy in the coating only as much as the contact area is discharged to the periphery of the weld. When the electrode force is less than 300 kgf, since the contact area between the Al—Fe-based coating in the coated steel sheet and the welding opposite material is not sufficient, a sufficient amount of the Al—Fe-based alloy is not discharged to the periphery of the weld, and the cross-sectional area of the filled metal in the periphery of the spot-welded portion may become less than $3.0 \times 10^4$ μm$^2$, which is not preferable. The electrode force is preferably 400 kgf or more.

Upslope: 5 or More Cycles

The upslope is a cycle of reaching a current at which the steel sheet substrate is melted and a nugget is formed, and, during the upslope, the Al—Fe-based coating on the surface layer of the coated steel sheet is melted and discharged to the periphery of the weld. When the upslope is less than 5 cycles, since the surface layer Al—Fe alloy is abruptly melted and incorporated into the nugget, the amount of Al, Si, Mo, Cu, and Ni contained in the first region or the second region of the filled metal may be insufficient, which is not preferable.

Cooling Rate in Spot Welding: Average Cooling Rate from 800° C. to 500° C. of 500° C./s or Faster When the cooling rate during cooling for the spot welding (during cooling after the formation of the nugget) is increased, the second region is finely dispersed in the filled metal, which is preferable. This is considered to be because, when (a molten substance that becomes) the filled metal discharged to the periphery of the weld during the welding is cooled, if the cooling rate is 500° C./s or faster, preferential solidification of the first region containing a relatively large amount of Fe and having a high solidification point is promoted, and the second region is divided, which suppresses the aggregation and coarsening of the second region.

For example, when the retention time of the electrodes is set to 5 or more cycles, and a cooling medium (compressed air or cooling water) is directly poured into the gap between the steel sheets, thereby promoting the cooling, the above cooling rate can be obtained. The number of the retention cycles of the electrodes is particularly preferably 5 or more cycles in order to obtain the above cooling rate. The larger the number of the retention cycles, the better; however, when the manufacturing efficiency is taken into account, 10 cycles or less is preferable.

The cooling rate is preferably 5,000° C./s or slower since, when the cooling rate is too fast, a defect (shrinkage cavity) is generated in the weld nugget or the filled metal.

The cooling rate in the spot welding can be obtained by the following method. An R-type thermocouple is welded at a position within 10 mm from the welding center between the coated steel member and the welding opposite material and a change in the temperature during the welding is measured. In the present embodiment, an average cooling rate from 800° C. to 500° C. at which the solidification of the filled metal progresses and the temperature is relatively stable is regarded as the cooling rate in the spot welding.

(D) Manufacturing Method of Coated Steel Sheet

A coated steel sheet suitable as a material for the first steel member included in the joint component according to the present embodiment can be manufactured by, for example, a manufacturing method including the following steps.

Manufacturing Method (i) A slab preparation step of melting and casting a steel having the above chemical composition, to manufacture a slab (ii) A hot rolling step of hot-rolling the obtained slab into a hot-rolled steel sheet (iii) A coiling step of coiling the hot-rolled steel sheet (iv) A hot-rolled sheet annealing step of annealing the hot-rolled steel sheet after the coiling step as necessary (v) As necessary, a cold rolling step of descaling the hot-rolled steel sheet after the coiling step or after the hot-rolled sheet annealing step, and of cold-rolling the hot-rolled steel sheet into a cold-rolled steel sheet (vi) An annealing step of annealing the hot-rolled steel sheet or the cold-rolled steel sheet to obtain an annealed steel sheet as necessary (vii) A coating step of applying an Al-based coating to the hot-rolled steel sheet, the cold-rolled steel sheet, or the annealed steel sheet to obtain a coated steel sheet Hereinafter, each step will be described.

<Slab Preparation Step>

In the slab preparation step, a steel having the above chemical composition is melted and casted to manufacture a slab to be subjected to hot rolling. For example, it is possible to use a slab manufactured by a continuous casting method after molten steel having the above chemical composition is melted using a converter, an electric furnace, or the like. Instead of the continuous casting method, an ingot-making method, a thin slab casting method, or the like may be adopted.

<Hot Rolling>

In the hot rolling step, the slab is heated, subjected to rough rolling, then subjected to descaling as necessary, and finally subjected to finish rolling. Hot rolling conditions are not limited.

<Coiling Step>

In the coiling step, for example, the hot-rolled steel sheet after hot rolling is coiled in a temperature range of 800° C. or lower. When the coiling temperature is higher than 800° C., since the hot-rolled steel sheet is coiled before transformation sufficiently progresses, and transformation progresses in the coil, the coil shape may become defective.

<Hot-Rolled Sheet Annealing Step>

In the hot-rolled sheet annealing step, for example, the hot-rolled steel sheet is annealed at 450° C. to 800° C. for five hours or longer in an atmosphere containing 80 vol % or more of nitrogen or in the atmosphere. Hot-rolled sheet annealing does not need to be performed at all times, but hot-rolled sheet annealing softens the hot-rolled steel sheet and makes it possible to reduce the load in the cold-rolling step, which is the next step, which is preferable.

<Cold Rolling Step>

In the cold rolling step, the hot-rolled steel sheet after the hot-rolled sheet annealing step (in a case where the hot-rolled sheet annealing step is not performed, the hot-rolled steel sheet after the coiling step) is subjected to descaling and is cold-rolled into a cold-rolled steel sheet. Descaling and cold rolling do not need to be performed at all times. However, in a case where cold rolling is performed, the cumulative rolling reduction in the cold rolling is preferably set to 30% or larger from the viewpoint of securing good flatness. On the other hand, in order to prevent the rolling force from becoming excessive, the cumulative rolling reduction in the cold rolling is preferably set to 80% or smaller.

The descaling method is not particularly limited, but pickling is preferable. Furthermore, in a case where pickling is performed, regarding a condition, it is preferable that only iron scales are removed by hydrochloric acid or sulfuric acid pickling.

<Annealing Step>

In the annealing step before coating, the hot-rolled steel sheet or the cold-rolled steel sheet is annealed in a temperature range of 700° C. to 950° C. Annealing before coating does not need to be performed at all times, but the annealing step softens the cold-rolled steel sheet and facilitates threading in a plating step, which is the next step, which is preferable.

<Coating Step>

In the coating step, an Al-based coating is applied to form the Al-based coating on a surface of a steel sheet (the hot-rolled steel sheet after the coiling step, the hot-rolled steel sheet after the hot-rolled sheet annealing step, the cold-rolled steel sheet after the cold rolling step, or the annealed steel sheet after the annealing step) to obtain a coated steel sheet. A method for forming the Al-based coating is not particularly limited, and a hot-dip plating method, an electro plating method, a vacuum vapor deposition method, a cladding method, a thermal spraying method, and the like can be used. The hot-dip plating method is the most popular in the industry.

When hot-dip plating is performed, in addition to Al, Fe is mixed in the plating bath as an impurity in many cases. Furthermore, in addition to the above elements, Si, Ni, Mg, Ti, Zn, Sb, Sn, Cu, Co, In, Bi, Ca, mischmetal, and the like may be contained in the plating bath as long as 70% or more of Al is contained.

In the case of performing hot-dip plating, after the annealed steel sheet after the annealing step is cooled to room temperature, the temperature may be raised again and then plating may be performed, or the annealed steel sheet after the annealing step may be cooled to 650° C. to 750° C., which is close to the plating bath temperature, after annealing and then hot-dip plating may be performed without cooling the annealed steel sheet to room temperature once.

Pretreatments and post-treatments of the Al-based coating are not particularly limited, and precoating, solvent coating, an alloying treatment, temper rolling, or the like can be performed. As the alloying treatment, for example, it is possible to anneal the Al-based coating at 450° C. to 800° C. Furthermore, as a post-heat treatment, temper rolling is useful for shape adjustment and the like, and for example, rolling reduction of 0.1% to 0.5% is possible.

EXAMPLE

Hereinafter, the present invention will be described more specifically with examples, but the present invention is not limited to these examples.

First, in manufacturing coated steel sheets coated steel members, and joint components, steels having chemical compositions shown in Table 1 were melted to obtain slabs for hot rolling.

TABLE 1

| | Steel | Chemical composition (mass %), remainder of Fe and impurity | | | | | | | | | | | |
|---|---|---|---|---|---|---|---|---|---|---|---|---|---|
| | No. | C | Si | Mn | P | S | N | Ti | B | Mo | Cu | Ni | Nb | Cr |
| Invention Example | A1 | 0.27 | 0.61 | 1.35 | 0.009 | 0.0018 | 0.005 | 0.030 | 0.0021 | | | | | |
| | A2 | 0.55 | 0.28 | 0.35 | 0.003 | 0.0003 | 0.003 | 0.027 | 0.0023 | | | | 0.03 | |
| | A3 | 0.37 | 0.19 | 1.12 | 0.009 | 0.0008 | 0.005 | 0.032 | 0.0022 | | 0.21 | | | |
| | A4 | 0.33 | 0.81 | 0.77 | 0.007 | 0.0012 | 0.003 | 0.040 | 0.0028 | 0.17 | | | | |
| | A5 | 0.40 | 0.30 | 0.35 | 0.009 | 0.0007 | 0.004 | 0.033 | 0.0030 | | | 0.20 | | |
| | A6 | 0.28 | 0.27 | 1.30 | 0.010 | 0.0009 | 0.006 | 0.026 | 0.0026 | | | | 0.04 | |
| | A7 | 0.28 | 0.30 | 0.55 | 0.040 | 0.0004 | 0.004 | 0.030 | 0.0023 | | 0.27 | | | |
| | A8 | 0.28 | 0.32 | 0.60 | 0.009 | 0.0080 | 0.003 | 0.028 | 0.0023 | | | | | |
| | A9 | 0.29 | 0.45 | 0.60 | 0.013 | 0.0011 | 0.008 | 0.050 | 0.0027 | | | | | |
| | A10 | 0.30 | 0.29 | 0.78 | 0.010 | 0.0013 | 0.003 | 0.015 | 0.0028 | | | | 0.04 | |
| | A11 | 0.36 | 0.43 | 0.70 | 0.009 | 0.0012 | 0.004 | 0.075 | 0.0026 | | | | | 0.25 |

TABLE 1-continued

| Category | Steel No. | (1) | (2) | (3) | (4) | (5) | (6) | (7) | (8) | (9) | (10) | (11) | (12) | (13) |
|---|---|---|---|---|---|---|---|---|---|---|---|---|---|---|
| | A12 | 0.30 | 0.40 | 0.76 | 0.008 | 0.0014 | 0.005 | 0.035 | 0.0008 | | | | | |
| | A13 | 0.30 | 0.38 | 0.63 | 0.010 | 0.008 | 0.006 | 0.040 | 0.0070 | 0.25 | | | | |
| | A14 | 0.34 | 0.40 | 1.12 | 0.010 | 0.0016 | 0.005 | 0.041 | 0.0024 | 0.22 | | | | |
| | A15 | 0.33 | 0.36 | 0.55 | 0.006 | 0.0020 | 0.004 | 0.038 | 0.0020 | 0.62 | | | | |
| | A16 | 0.43 | 0.40 | 1.05 | 0.011 | 0.0021 | 0.005 | 0.036 | 0.0023 | | 0.30 | | | |
| | A17 | 0.29 | 0.30 | 0.45 | 0.009 | 0.0017 | 0.006 | 0.043 | 0.0023 | | 0.80 | | | |
| | A18 | 0.30 | 0.47 | 0.90 | 0.010 | 0.0017 | 0.004 | 0.040 | 0.0022 | | | 0.26 | | |
| | A19 | 0.42 | 0.37 | 0.51 | 0.012 | 0.0014 | 0.004 | 0.038 | 0.0021 | | | 0.75 | | |
| | A20 | 0.28 | 0.20 | 1.30 | 0.007 | 0.0005 | 0.003 | 0.029 | 0.0020 | 0.01 | 0.02 | 0.01 | 0.06 | 0.40 |
| | A21 | 0.31 | 0.40 | 0.80 | 0.008 | 0.0006 | 0.004 | 0.035 | 0.0022 | 0.21 | 0.25 | 0.18 | 0.05 | 0.15 |
| | A22 | 0.35 | 0.43 | 0.62 | 0.008 | 0.0005 | 0.004 | 0.035 | 0.0025 | 0.21 | 0.25 | 0.16 | 0.04 | 0.10 |
| | A23 | 0.48 | 0.44 | 0.45 | 0.008 | 0.0005 | 0.003 | 0.028 | 0.0025 | 0.21 | 0.25 | 0.16 | 0.03 | 0.12 |
| | A24 | 0.45 | 0.50 | 0.45 | 0.010 | 0.0006 | 0.004 | 0.034 | 0.0023 | 0.20 | | 0.02 | 0.02 | 0.30 |
| | A25 | 0.34 | 0.55 | 0.60 | 0.010 | 0.0006 | 0.004 | 0.034 | 0.0023 | 0.20 | 0.02 | 0.40 | 0.04 | 0.40 |
| | A26 | 0.35 | 0.41 | 0.65 | 0.008 | 0.0004 | 0.004 | 0.032 | 0.0024 | 0.19 | 0.24 | 0.08 | 0.04 | 0.09 |
| Comparative Example | a1 | 0.20 | 0.30 | 1.15 | 0.011 | 0.0012 | 0.005 | 0.034 | 0.0024 | 0.20 | | | | |
| | a2 | 0.80 | 0.40 | 1.10 | 0.010 | 0.0013 | 0.004 | 0.035 | 0.0023 | | | | | 0.15 |
| | a3 | 0.42 | 0.65 | 2.40 | 0.016 | 0.0018 | 0.005 | 0.037 | 0.0022 | | | | | 0.20 |
| | a4 | 0.36 | 0.25 | 1.02 | 0.120 | 0.0014 | 0.004 | 0.033 | 0.0023 | | 0.29 | | | |
| | a5 | 0.38 | 0.63 | 1.10 | 0.018 | 0.0800 | 0.005 | 0.032 | 0.0025 | | | | | |
| | a6 | 0.42 | 0.55 | 1.24 | 0.013 | 0.0018 | 0.100 | 0.036 | 0.0024 | 0.38 | | | | 0.12 |
| | a7 | 0.41 | 0.57 | 1.30 | 0.015 | 0.0012 | 0.005 | 0.002 | 0.0022 | | 0.25 | | | |
| | a8 | 0.30 | 0.21 | 1.25 | 0.008 | 0.0018 | 0.005 | 0.300 | 0.0027 | 0.13 | | | | 0.35 |
| | a9 | 0.39 | 0.66 | 1.20 | 0.011 | 0.0013 | 0.006 | 0.034 | 0.0320 | | | | | 0.28 |
| | a10 | 0.38 | 0.50 | 1.22 | 0.017 | 0.0016 | 0.005 | 0.031 | 0.0027 | 2.00 | | | | |
| | a11 | 0.40 | 0.60 | 1.25 | 0.015 | 0.0022 | 0.005 | 0.029 | 0.0026 | | | 1.90 | 0.08 | |

| | Steel No. | Chemical composition (mass %), remainder of Fe and impurity | | | | | | | Transformation point (° C.) | | Upper critical cooling rate (° C./s) |
|---|---|---|---|---|---|---|---|---|---|---|---|
| | | V | Ca | Al | Sn | W | Sb | Zr | REM | Ac3 | Ms | |
| Invention Example | A1 | | | | | | | | | 826 | 392 | 30 |
| | A2 | | | | | | | | | 776 | 316 | 10 |
| | A3 | | | | | | | | | 783 | 360 | 30 |
| | A4 | | | | | | | | | 850 | 386 | 20 |
| | A5 | | | | | | | | | 803 | 371 | 40 |
| | A6 | | 0.002 | | | | | | | 797 | 389 | 30 |
| | A7 | | | | | | | | 0.12 | 834 | 413 | 30 |
| | A8 | | | 0.03 | | 0.22 | | | | 826 | 412 | 30 |
| | A9 | | | | | | | 0.12 | | 839 | 408 | 30 |
| | A10 | | | | | | | | | 805 | 404 | 20 |
| | A11 | | | | | | | | | 826 | 375 | 30 |
| | A12 | | | | | 0.34 | | | | 829 | 402 | 40 |
| | A13 | | | | | | | | | 838 | 405 | 10 |
| | A14 | | | | 0.10 | | | | | 820 | 373 | 20 |
| | A15 | | | | | | | | | 840 | 392 | 10 |
| | A16 | | | | | | 0.08 | | | 790 | 330 | 20 |
| | A17 | | | | | | | | | 816 | 401 | 10 |
| | A18 | 0.15 | | | | | | | | 840 | 393 | 20 |
| | A19 | | | | | | | | 0.20 | 798 | 349 | 10 |
| | A20 | | | 0.04 | | | | | | 794 | 382 | 20 |
| | A21 | | | 0.04 | | | | | | 816 | 382 | 20 |
| | A22 | | | 0.04 | 0.20 | | | | | 823 | 372 | 20 |
| | A23 | | | 0.03 | 0.06 | 0.26 | | | | 806 | 325 | 20 |
| | A24 | | | 0.02 | | | | | | 812 | 348 | 20 |
| | A25 | | 0.003 | 0.04 | | | | | | 824 | 376 | 10 |
| | A26 | | | 0.04 | | | | | | 826 | 378 | 20 |
| Comparative Example | a1 | | | 0.06 | | | | | | 827 | 422 | 30 |
| | a2 | | | | | | | | 0.15 | 742 | 207 | 10 |
| | a3 | | | | 0.25 | | | | | 780 | 286 | 10 |
| | a4 | 0.27 | | | | | | | | 896 | 361 | 30 |
| | a5 | | | | | | | 0.32 | | 821 | 357 | 30 |
| | a6 | | | | | | | | | 817 | 330 | 20 |
| | a7 | | | | 0.20 | | 0.18 | | | 791 | 326 | 30 |
| | a8 | | | | | | | | | 901 | 375 | 20 |
| | a9 | 0.34 | | | | | | | | 842 | 342 | 20 |
| | a10 | | 0.001 | | | | | 0.33 | | 873 | 342 | 10 |
| | a11 | | | | 0.38 | | | | | 780 | 302 | 10 |

Example 1

The obtained slabs were hot-rolled and coiled at a temperature of 800° C. or lower to obtain hot-rolled steel sheets each having a thickness of 2.7 mm. Cold rolling was performed on the hot-rolled steel sheets after hot rolling to obtain cold-rolled steel sheets each having a thickness of 1.6 mm. Al plating was applied to the cold-rolled steel sheets to obtain coated steel sheets each having an Al-based coating.

Chemical compositions of the coated steel sheets at a ¼ position of the sheet thickness from the surface of each of the steel sheets in the sheet thickness direction were the same as chemical compositions of the slabs.

Heat treatments in which the coated steel sheet was heated at a temperature rising rate and a heating temperature shown in Table 2A, Table 2D, and Table 2G, retained within a range of the heating temperature±10° C. for 60 seconds, and cooled to the Ms point or lower at an average cooling rate shown in Table 2A, Table 2D, and Table 2G were performed to obtain coated steel members.

Chemical compositions of the coated steel members at a ¼ position of the sheet thickness from the surface of each of steel sheet substrates in the sheet thickness direction were the same as the chemical compositions of the slabs.

The obtained coated steel members were cut out and observed with SEM, tensile tests were performed by the following method, and the thicknesses and tensile strengths of Al—Fe-based coatings were evaluated. The evaluation results are shown in Table 2A, Table 2D, and Table 2G.

<Thickness of Al—Fe-Based Coating>

A measurement sample was cut out from the steel member except for the end portion, a cross section was observed at 10 visual fields with a scanning electron microscope, the thicknesses of the Al—Fe-based coating were measured, and the average value was regarded as the thickness of the Al—Fe-based coating.

<Tensile Strength>

The tensile test was performed in accordance with the provisions of ASTM Standard E8. After a soaked portion (portion separated from the end portion by 50 mm or more) of each of the coated steel members was ground to a thickness of 1.2 mm, and a half-sized sheet-shaped test piece of ASTM standard E8 (parallel portion length: 32 mm, parallel portion sheet width: 6.25 mm) was collected such that a test direction was parallel to a rolling direction. Then, a room temperature tensile test was performed at a strain rate of 3 mm/min to measure a tensile strength (maximum strength). In the present example, a case where the tensile strength was more than 1,500 MPa was evaluated as having excellent strength.

The steel members were welded under spot-welding conditions shown in Table 2A, Table 2D, and Table 2G: gaps, contact angles, electrode forces, upslope, and cooling rates to obtain joint components. In the present example, opposite materials were also the same steel member. The nugget diameters were 5.1 to 6.3 mm. A welding machine was a single-phase AC type (60 Hz power source), and a current at which the above nugget diameter was formed within a welding time of 20 cycles was imparted. As an electrode, an alumina-dispersed copper electrode having a tip diameter of 8 mmσ and a dome radius shape was used.

In the obtained joint components, the cross-sectional areas of the filled metals, the filling ratios, the amounts of Al, Fe, Si, Mo, Cu, and Ni, and fracture resistance in CCT were evaluated by the following methods. The evaluation results are shown in Table 2B, Table 2C, Table 2E, Table 2F, Table 2H, and Table 2I.

<Cross-Sectional Area of Filled Metal>

A vertical cross section passing through the central position of a welding point was cut out such that a cross section of the spot-welded portion (the nugget and the corona bond) and the filled metal in the joint component could be observed, and the area of the filled metal was obtained in the cross section. Under the welding conditions, 5 or more samples were cut out and the cross-sectional areas were obtained, and the average value was regarded as the cross-sectional area of the filled metal.

<Filling Ratio>

A vertical cross section passing through the central position of a welding point was cut out such that a cross section of the spot-welded portion (the nugget and the corona bond) and the filled metal in the joint component could be observed, and the proportion occupied by the filled metal in the region excluding the steel members was obtained in a range from the end of a pressure welded portion (corona bond) in the cross section to 100 μm toward the gap portion. Under the welding conditions, 5 or more samples were cut out and the proportions were obtained, and the minimum value was regarded as the filling ratio of the filled metal.

<The Amount of Fe, Al, Si, Mo, Cu, and Ni in Filled Metal>

A vertical cross section passing through the central position of a welding point was cut out such that a cross section of the spot-welded portion (the nugget and the corona bond) and the filled metal in the joint component could be observed, a reflected electron image was acquired from this sample using a scanning electron microscope, spot elemental analysis (beam diameter: 1 μm or less) was performed at 10 points using an electron probe micro-analyzer (EPMA) on two types of structures with different contrasts, and the average value was regarded as the amount of Al, Fe, Si, Mo, Cu, and Ni contained in the filled metal.

<Size of Second Region in Filled Metal>

A vertical cross section passing through the central position of a welding point was cut out such that a cross section of the spot-welded portion (the nugget and the corona bond) and the filled metal in the joint component could be observed, a reflected electron image was acquired from this sample using a scanning electron microscope, and the size of an island-like second region surrounded by first regions was measured in two types of structures with different contrasts. Here, the size of the second region was defined as the average value of the distance between parallel lines that were lines parallel to the horizontal direction and sandwiched the second region (horizontal Feret diameter) and the distance between parallel lines that were lines parallel to the vertical direction and sandwiched the second region (vertical Feret diameter). The horizontal direction was the longitudinal direction of the joint components, and the vertical direction was the sheet thickness direction perpendicular to the longitudinal direction. At the time of measurement, the size of 15 of the island-like second region surrounded by first regions was measured, and the average value thereof was regarded as the size of the second region included in the filled metal.

<Fracture Cycle by CCT>

Hydrogen embrittlement resistance in a corrosive environment was evaluated by a corrosion promotion test by CCT (composite cycle test). Specifically, a sample having the spot-welded portion at the center and having a length of 100 mm and a width of 50 mm was collected from the joint component, CCT was performed in accordance with the provisions of JASO standards M609 and M610, and the hydrogen embrittlement resistance was evaluated by the number of cycles during which the spot-welded portion did not fracture. CCT was performed up to 360 cycles, a vertical cross section passing through the central position of a welding point was cut out from a sample that did not fracture during the 360 cycles, and, when a decrease in the cross-sectional area of the filled metal was 10% or less before and after the test, the hydrogen embrittlement resistance was considered to be excellent particularly in a corrosive environment.

TABLE 2A

| | Reference symbol | Steel No. | Coated steel sheet Al-based coating amount (g/m²) | Heat treatment Temperature rising rate (° C./s) | Heating temperature (° C.) | Cooling rate (° C./s) | Steel member Al-Fe-based coating thickness (µm) | Tensile strength (MPa) | Spot-welding step Gap (µm) | Contact angle (degrees) | Electrode force (kgf) | Upslope (cyc) | Cooling rate (° C./s) |
|---|---|---|---|---|---|---|---|---|---|---|---|---|---|
| Invention Example | B1 | A1 | 72 | 7 | 920 | 60 | 34 | 1856 | 60 | 0 | 400 | 10 | 800 |
| | B2 | A2 | 80 | 7 | 920 | 60 | 42 | 2741 | 60 | 0 | 400 | 10 | 800 |
| | B3 | A3 | 83 | 7 | 920 | 60 | 43 | 2256 | 60 | 0 | 400 | 10 | 800 |
| | B4 | A4 | 72 | 7 | 920 | 60 | 32 | 2063 | 60 | 0 | 400 | 10 | 800 |
| | B5 | A5 | 73 | 7 | 920 | 60 | 33 | 2298 | 60 | 0 | 400 | 10 | 800 |
| | B6 | A6 | 75 | 7 | 920 | 60 | 35 | 1882 | 60 | 0 | 400 | 10 | 800 |
| | B7 | A7 | 73 | 7 | 920 | 60 | 33 | 1802 | 60 | 0 | 400 | 10 | 800 |
| | B8 | A8 | 73 | 7 | 920 | 60 | 33 | 1809 | 60 | 0 | 400 | 10 | 800 |
| | B9 | A9 | 74 | 7 | 920 | 60 | 34 | 1855 | 60 | 0 | 400 | 10 | 800 |
| | B10 | A10 | 74 | 7 | 920 | 60 | 33 | 1912 | 60 | 0 | 400 | 10 | 800 |
| | B11 | A11 | 72 | 7 | 920 | 60 | 31 | 2162 | 60 | 0 | 400 | 10 | 800 |
| | B12 | A12 | 73 | 7 | 920 | 60 | 32 | 1907 | 60 | 0 | 400 | 10 | 800 |
| | B13 | A13 | 76 | 7 | 920 | 60 | 36 | 1894 | 60 | 0 | 400 | 10 | 800 |
| | B14 | A14 | 74 | 7 | 920 | 60 | 33 | 2116 | 60 | 0 | 400 | 10 | 800 |
| | B15 | A15 | 74 | 7 | 920 | 60 | 33 | 2018 | 60 | 0 | 400 | 10 | 800 |
| | B16 | A16 | 78 | 7 | 920 | 60 | 37 | 2497 | 60 | 0 | 400 | 10 | 800 |
| | B17 | A17 | 79 | 7 | 920 | 60 | 39 | 1835 | 60 | 0 | 400 | 10 | 800 |
| | B18 | A18 | 77 | 7 | 920 | 60 | 36 | 1924 | 60 | 0 | 400 | 10 | 800 |
| | B19 | A19 | 81 | 7 | 920 | 60 | 39 | 2396 | 60 | 0 | 400 | 10 | 800 |
| | B20 | A20 | 75 | 7 | 920 | 60 | 37 | 1880 | 60 | 0 | 400 | 10 | 800 |
| | B21 | A21 | 74 | 7 | 920 | 60 | 38 | 1956 | 60 | 0 | 400 | 10 | 800 |
| | B22 | A22 | 76 | 7 | 920 | 60 | 37 | 2114 | 60 | 0 | 400 | 10 | 800 |
| | B23 | A23 | 78 | 7 | 920 | 60 | 38 | 2603 | 60 | 0 | 400 | 10 | 800 |
| | B24 | A24 | 77 | 7 | 920 | 60 | 38 | 2528 | 60 | 0 | 400 | 10 | 800 |
| | B25 | A25 | 79 | 7 | 920 | 60 | 39 | 2074 | 60 | 0 | 400 | 10 | 800 |
| | B26 | A20 | 75 | 50 | 920 | 60 | 36 | 1878 | 60 | 0 | 400 | 10 | 800 |
| | B27 | A20 | 75 | 7 | 980 | 40 | 38 | 1875 | 60 | 0 | 400 | 10 | 800 |
| | B28 | A20 | 75 | 7 | 920 | 60 | 37 | 1880 | 200 | 0 | 400 | 10 | 800 |
| | B29 | A20 | 75 | 7 | 920 | 60 | 37 | 1880 | 60 | 5 | 400 | 10 | 800 |
| | B30 | A20 | 75 | 7 | 920 | 60 | 37 | 1880 | 60 | 0 | 500 | 20 | 800 |
| | B31 | A20 | 75 | 7 | 920 | 60 | 37 | 1880 | 60 | 0 | 400 | 10 | 1200 |
| | B32 | A21 | 74 | 500 | 920 | 60 | 37 | 1956 | 60 | 0 | 400 | 10 | 800 |
| | B33 | A21 | 74 | 7 | 980 | 40 | 38 | 1952 | 60 | 0 | 400 | 10 | 800 |
| | B34 | A21 | 74 | 7 | 920 | 60 | 38 | 1956 | 350 | 0 | 400 | 10 | 800 |

TABLE 2B

| | Reference symbol | Steel No. | Joint component Cross-sectional area of filled metal (×10⁴ µm²) | Filling ratio (%) | Al concentration in first region (mass %) | Fe concentration in first region (mass %) | Si concentration in first region (mass %) | Al concentration in second region (mass %) | Fe concentration in second region (mass %) | Si concentration in second region (mass %) |
|---|---|---|---|---|---|---|---|---|---|---|
| Invention Example | B1 | A1 | 7.3 | 98 | 25 | 66 | 6 | 42 | 52 | 3 |
| | B2 | A2 | 7.4 | 97 | 24 | 65 | 8 | 43 | 51 | 3 |
| | B3 | A3 | 7.3 | 97 | 25 | 66 | 6 | 43 | 51 | 3 |
| | B4 | A4 | 8.3 | 96 | 28 | 64 | 5 | 43 | 52 | 2 |
| | B5 | A5 | 7.4 | 97 | 27 | 64 | 6 | 47 | 47 | 3 |
| | B6 | A6 | 6.8 | 97 | 26 | 66 | 5 | 48 | 46 | 3 |
| | B7 | A7 | 6.3 | 96 | 28 | 63 | 6 | 46 | 48 | 3 |
| | B8 | A8 | 7.3 | 97 | 30 | 60 | 7 | 45 | 49 | 3 |
| | B9 | A9 | 7.4 | 97 | 23 | 68 | 6 | 48 | 46 | 3 |
| | B10 | A10 | 9.0 | 96 | 28 | 64 | 5 | 49 | 46 | 2 |
| | B11 | A11 | 8.1 | 96 | 27 | 64 | 6 | 44 | 50 | 3 |
| | B12 | A12 | 8.2 | 97 | 24 | 68 | 5 | 43 | 52 | 2 |
| | B13 | A13 | 8.1 | 95 | 23 | 67 | 7 | 43 | 51 | 3 |
| | B14 | A14 | 7.8 | 96 | 31 | 60 | 6 | 42 | 52 | 3 |
| | B15 | A15 | 7.8 | 97 | 27 | 64 | 6 | 43 | 51 | 3 |
| | B16 | A16 | 6.5 | 96 | 24 | 68 | 5 | 45 | 49 | 3 |
| | B17 | A17 | 6.5 | 96 | 27 | 64 | 6 | 44 | 51 | 2 |
| | B18 | A18 | 7.8 | 96 | 28 | 64 | 5 | 44 | 51 | 2 |
| | B19 | A19 | 7.9 | 97 | 29 | 62 | 6 | 46 | 49 | 2 |
| | B20 | A20 | 6.8 | 97 | 26 | 64 | 8 | 42 | 53 | 3 |

TABLE 2B-continued

| | | Joint component | | | | | | | |
|---|---|---|---|---|---|---|---|---|---|
| Reference symbol | Steel No. | Cross-sectional area of filled metal (×10⁴ μm²) | Filling ratio (%) | Al concentration in first region (mass %) | Fe concentration in first region (mass %) | Si concentration in first region (mass %) | Al concentration in second region (mass %) | Fe concentration in second region (mass %) | Si concentration in second region (mass %) |
| B21 | A21 | 8.6 | 96 | 28 | 63 | 5 | 44 | 50 | 3 |
| B22 | A22 | 8.5 | 97 | 25 | 64 | 9 | 41 | 53 | 2 |
| B23 | A23 | 8.8 | 97 | 29 | 62 | 5 | 43 | 51 | 3 |
| B24 | A24 | 9.2 | 96 | 27 | 63 | 5 | 43 | 50 | 3 |
| B25 | A25 | 10.1 | 96 | 28 | 63 | 5 | 43 | 50 | 3 |
| B26 | A20 | 6.9 | 97 | 26 | 64 | 7 | 41 | 52 | 3 |
| B27 | A20 | 6.8 | 96 | 26 | 63 | 8 | 41 | 52 | 2 |
| B28 | A20 | 7.2 | 88 | 26 | 63 | 8 | 41 | 52 | 3 |
| B29 | A20 | 6.4 | 87 | 26 | 63 | 7 | 42 | 52 | 2 |
| B30 | A20 | 7.5 | 96 | 28 | 62 | 8 | 43 | 51 | 3 |
| B31 | A20 | 6.9 | 97 | 25 | 64 | 8 | 42 | 53 | 2 |
| B32 | A21 | 8.5 | 96 | 27 | 63 | 4 | 44 | 50 | 2 |
| B33 | A21 | 8.6 | 96 | 28 | 63 | 5 | 44 | 49 | 3 |
| B34 | A21 | 8.9 | 85 | 28 | 62 | 5 | 43 | 49 | 3 |

TABLE 2C

| | | | Joint component | | | | | |
|---|---|---|---|---|---|---|---|---|
| | Reference symbol | Steel No. | Mo concentration in first region (mass %) | Cu concentration in first region (mass %) | Ni concentration in first region (mass %) | Mo + Cu + Ni in first region (mass %) | Mo concentration in second region (mass %) | Cu concentration in second region (mass %) |
| Invention Example | B1 | A1 | 0.00 | 0.00 | 0.00 | 0.00 | 0.00 | 0.00 |
| | B2 | A2 | 0.00 | 0.00 | 0.00 | 0.00 | 0.00 | 0.00 |
| | B3 | A3 | 0.00 | 0.11 | 0.00 | 0.11 | 0.00 | 0.10 |
| | B4 | A4 | 0.08 | 0.00 | 0.00 | 0.08 | 0.06 | 0.00 |
| | B5 | A5 | 0.00 | 0.00 | 0.19 | 0.19 | 0.00 | 0.00 |
| | B6 | A6 | 0.00 | 0.00 | 0.00 | 0.00 | 0.00 | 0.00 |
| | B7 | A7 | 0.00 | 0.16 | 0.00 | 0.16 | 0.00 | 0.13 |
| | B8 | A8 | 0.00 | 0.00 | 0.00 | 0.00 | 0.00 | 0.00 |
| | B9 | A9 | 0.00 | 0.00 | 0.00 | 0.00 | 0.00 | 0.00 |
| | B10 | A10 | 0.00 | 0.00 | 0.00 | 0.00 | 0.00 | 0.00 |
| | B11 | A11 | 0.00 | 0.00 | 0.00 | 0.00 | 0.00 | 0.00 |
| | B12 | A12 | 0.00 | 0.00 | 0.00 | 0.00 | 0.00 | 0.00 |
| | B13 | A13 | 0.10 | 0.00 | 0.00 | 0.10 | 0.07 | 0.00 |
| | B14 | A14 | 0.08 | 0.00 | 0.00 | 0.08 | 0.05 | 0.00 |
| | B15 | A15 | 0.26 | 0.00 | 0.00 | 0.26 | 0.17 | 0.00 |
| | B16 | A16 | 0.00 | 0.17 | 0.00 | 0.17 | 0.00 | 0.13 |
| | B17 | A17 | 0.00 | 0.41 | 0.00 | 0.41 | 0.00 | 0.39 |
| | B18 | A18 | 0.00 | 0.00 | 0.21 | 0.21 | 0.00 | 0.00 |
| | B19 | A19 | 0.00 | 0.00 | 0.65 | 0.65 | 0.00 | 0.00 |
| | B20 | A20 | 0.00 | 0.01 | 0.02 | 0.03 | 0.00 | 0.02 |
| | B21 | A21 | 0.10 | 0.16 | 0.17 | 0.43 | 0.07 | 0.11 |
| | B22 | A22 | 0.08 | 0.14 | 0.15 | 0.37 | 0.06 | 0.14 |
| | B23 | A23 | 0.09 | 0.13 | 0.14 | 0.36 | 0.05 | 0.11 |
| | B24 | A24 | 0.09 | 0.00 | 0.02 | 0.11 | 0.07 | 0.00 |
| | B25 | A25 | 0.09 | 0.02 | 0.32 | 0.43 | 0.07 | 0.02 |
| | B26 | A20 | 0.01 | 0.01 | 0.01 | 0.03 | 0.00 | 0.02 |
| | B27 | A20 | 0.00 | 0.02 | 0.01 | 0.03 | 0.00 | 0.02 |
| | B28 | A20 | 0.00 | 0.01 | 0.02 | 0.03 | 0.00 | 0.02 |
| | B29 | A20 | 0.00 | 0.01 | 0.02 | 0.03 | 0.01 | 0.01 |
| | B30 | A20 | 0.00 | 0.01 | 0.02 | 0.03 | 0.00 | 0.02 |
| | B31 | A20 | 0.00 | 0.01 | 0.02 | 0.03 | 0.01 | 0.02 |
| | B32 | A21 | 0.10 | 0.16 | 0.17 | 0.43 | 0.07 | 0.11 |
| | B33 | A21 | 0.10 | 0.15 | 0.17 | 0.42 | 0.07 | 0.11 |
| | B34 | A21 | 0.10 | 0.16 | 0.17 | 0.43 | 0.06 | 0.11 |

TABLE 2C-continued

| | | | Joint component | | | | |
|---|---|---|---|---|---|---|---|
| | Reference symbol | Steel No. | Ni concentration in second region (mass %) | Mo + Cu + Ni in second region (mass %) | Size of second region (μm) | CCT limit cycle (cyc) | Cross-sectional area of filled metal after CCT ($\times 10^4$ μm$^2$) | Cross-sectional area decrease rate after CCT 360 cycles (%) |
| Invention Example | B1 | A1 | 0.00 | 0.00 | 17 | 360 | 5.9 | 19 |
| | B2 | A2 | 0.00 | 0.00 | 14 | 360 | 5.9 | 20 |
| | B3 | A3 | 0.00 | 0.10 | 16 | 360 | 6.0 | 18 |
| | B4 | A4 | 0.00 | 0.06 | 19 | 360 | 6.7 | 19 |
| | B5 | A5 | 0.07 | 0.07 | 15 | 360 | 5.7 | 23 |
| | B6 | A6 | 0.00 | 0.00 | 14 | 360 | 5.0 | 26 |
| | B7 | A7 | 0.00 | 0.13 | 13 | 360 | 4.6 | 27 |
| | B8 | A8 | 0.00 | 0.00 | 17 | 360 | 6.0 | 18 |
| | B9 | A9 | 0.00 | 0.00 | 12 | 360 | 6.0 | 19 |
| | B10 | A10 | 0.00 | 0.00 | 12 | 360 | 7.4 | 18 |
| | B11 | A11 | 0.00 | 0.00 | 12 | 360 | 6.6 | 19 |
| | B12 | A12 | 0.00 | 0.00 | 14 | 360 | 6.4 | 22 |
| | B13 | A13 | 0.00 | 0.07 | 16 | 360 | 6.1 | 25 |
| | B14 | A14 | 0.00 | 0.05 | 17 | 360 | 5.9 | 24 |
| | B15 | A15 | 0.00 | 0.17 | 16 | 360 | 7.1 | 9 |
| | B16 | A16 | 0.00 | 0.13 | 18 | 360 | 4.8 | 26 |
| | B17 | A17 | 0.00 | 0.39 | 18 | 360 | 6.2 | 5 |
| | B18 | A18 | 0.10 | 0.10 | 19 | 360 | 6.5 | 17 |
| | B19 | A19 | 0.25 | 0.25 | 15 | 360 | 7.4 | 6 |
| | B20 | A20 | 0.00 | 0.03 | 13 | 360 | 5.5 | 19 |
| | B21 | A21 | 0.07 | 0.25 | 14 | 360 | 8.1 | 6 |
| | B22 | A22 | 0.05 | 0.25 | 14 | 360 | 8.1 | 5 |
| | B23 | A23 | 0.06 | 0.22 | 15 | 360 | 8.2 | 7 |
| | B24 | A24 | 0.02 | 0.09 | 14 | 360 | 8.0 | 13 |
| | B25 | A25 | 0.13 | 0.22 | 14 | 360 | 9.6 | 5 |
| | B26 | A20 | 0.00 | 0.02 | 13 | 360 | 5.6 | 19 |
| | B27 | A20 | 0.00 | 0.02 | 12 | 360 | 5.5 | 19 |
| | B28 | A20 | 0.00 | 0.02 | 13 | 360 | 6.0 | 17 |
| | B29 | A20 | 0.00 | 0.02 | 12 | 360 | 5.2 | 19 |
| | B30 | A20 | 0.00 | 0.02 | 14 | 360 | 6.2 | 17 |
| | B31 | A20 | 0.00 | 0.03 | 7 | 360 | 6.0 | 13 |
| | B32 | A21 | 0.07 | 0.25 | 14 | 360 | 8.0 | 6 |
| | B33 | A21 | 0.06 | 0.24 | 13 | 360 | 8.2 | 5 |
| | B34 | A21 | 0.07 | 0.24 | 13 | 360 | 8.4 | 6 |

TABLE 2D

| | | | Coated steel sheet Al-based coating amount (g/m$^2$) | Heat treatment | | | Steel member | | Spot-welding step | | | | |
|---|---|---|---|---|---|---|---|---|---|---|---|---|---|
| | Reference symbol | Steel No. | | Temperature rising rate (° C./s) | Heating temperature (° C.) | Cooling rate (° C./s) | Al-Fe-based coating thickness (μm) | Tensile strength (MPa) | Gap (μm) | Contact angle (degrees) | Electrode force (kgf) | Upslope (cyc) | Cooling rate (° C./s) |
| Invention Example | B35 | A21 | 74 | 7 | 920 | 60 | 38 | 1956 | 60 | 10 | 400 | 10 | 800 |
| | B36 | A21 | 74 | 7 | 920 | 60 | 38 | 1956 | 60 | 0 | 500 | 25 | 800 |
| | B37 | A21 | 74 | 7 | 920 | 60 | 38 | 1956 | 60 | 0 | 400 | 10 | 1200 |
| | B38 | A22 | 76 | 200 | 920 | 60 | 37 | 2114 | 60 | 0 | 400 | 10 | 800 |
| | B39 | A22 | 76 | 7 | 880 | 40 | 36 | 2117 | 60 | 0 | 400 | 10 | 800 |
| | B40 | A22 | 76 | 7 | 920 | 60 | 37 | 2114 | 300 | 0 | 400 | 10 | 800 |
| | B41 | A22 | 76 | 7 | 920 | 60 | 37 | 2114 | 60 | 8 | 400 | 10 | 800 |
| | B42 | A22 | 76 | 7 | 920 | 60 | 37 | 2114 | 60 | 0 | 600 | 20 | 800 |
| | B43 | A22 | 76 | 7 | 920 | 60 | 37 | 2114 | 60 | 0 | 400 | 10 | 1200 |
| | B44 | A23 | 78 | 100 | 920 | 60 | 38 | 2604 | 60 | 0 | 400 | 10 | 800 |
| | B45 | A23 | 78 | 7 | 980 | 40 | 37 | 2600 | 60 | 0 | 400 | 10 | 800 |
| | B46 | A23 | 78 | 7 | 920 | 60 | 38 | 2603 | 250 | 0 | 400 | 10 | 800 |
| | B47 | A23 | 78 | 7 | 920 | 60 | 38 | 2603 | 60 | 7 | 400 | 10 | 800 |
| | B48 | A23 | 78 | 7 | 920 | 60 | 38 | 2603 | 60 | 0 | 600 | 25 | 800 |
| | B49 | A23 | 78 | 7 | 920 | 60 | 38 | 2603 | 60 | 0 | 400 | 10 | 1200 |
| | B50 | A24 | 77 | 30 | 920 | 60 | 38 | 2530 | 60 | 0 | 400 | 10 | 800 |
| | B51 | A24 | 77 | 7 | 950 | 40 | 39 | 2526 | 60 | 0 | 400 | 10 | 800 |

TABLE 2D-continued

| | | Coated steel sheet Al-based coating amount (g/m²) | Heat treatment | | Steel member | | Spot-welding step | | | | |
|---|---|---|---|---|---|---|---|---|---|---|---|
| | | | Temperature rising rate (° C./s) | Heating temperature (° C.) | Cooling rate (° C./s) | Al-Fe-based coating thickness (μm) | Tensile strength (MPa) | Gap (μm) | Contact angle (degrees) | Electrode force (kgf) | Upslope (cyc) | Cooling rate (° C./s) |
| Reference symbol | Steel No. | | | | | | | | | | | |
| B52 | A24 | 77 | 7 | 920 | 60 | 38 | 2528 | 100 | 0 | 400 | 10 | 800 |
| B53 | A24 | 77 | 7 | 920 | 60 | 38 | 2528 | 60 | 3 | 400 | 10 | 800 |
| B54 | A24 | 77 | 7 | 920 | 60 | 38 | 2528 | 60 | 0 | 500 | 20 | 800 |
| B55 | A24 | 77 | 7 | 920 | 60 | 38 | 2528 | 60 | 0 | 400 | 10 | 1200 |
| B56 | A25 | 79 | 400 | 920 | 60 | 38 | 2076 | 60 | 0 | 400 | 10 | 800 |
| B57 | A25 | 79 | 7 | 1000 | 40 | 39 | 2060 | 60 | 0 | 400 | 10 | 800 |
| B58 | A25 | 79 | 7 | 920 | 60 | 39 | 2074 | 400 | 0 | 400 | 10 | 800 |
| B59 | A25 | 79 | 7 | 920 | 60 | 39 | 2074 | 60 | 8 | 400 | 10 | 800 |
| B60 | A25 | 79 | 7 | 920 | 60 | 39 | 2074 | 60 | 0 | 600 | 25 | 800 |
| B61 | A25 | 79 | 7 | 920 | 60 | 39 | 2074 | 60 | 0 | 400 | 10 | 1200 |
| B62 | A26 | 77 | 100 | 920 | 60 | 38 | 2092 | 60 | 0 | 400 | 10 | 800 |
| B63 | A26 | 77 | 7 | 880 | 40 | 38 | 2092 | 60 | 0 | 400 | 10 | 800 |
| B64 | A26 | 77 | 7 | 920 | 60 | 38 | 2095 | 300 | 0 | 400 | 10 | 800 |
| B65 | A26 | 77 | 7 | 920 | 60 | 37 | 2095 | 60 | 9 | 400 | 10 | 800 |
| B66 | A26 | 77 | 7 | 920 | 60 | 37 | 2092 | 60 | 0 | 600 | 20 | 800 |
| B67 | A26 | 77 | 7 | 920 | 60 | 38 | 2092 | 60 | 0 | 400 | 10 | 1200 |

TABLE 2E

| | | | Joint component | | | | | | |
|---|---|---|---|---|---|---|---|---|---|
| | Reference symbol | Steel No. | Cross-sectional area of filled metal (×10⁴ μm²) | Filling ratio (%) | Al concentration in first region (mass %) | Fe concentration in first region (mass %) | Si concentration in first region (mass %) | Al concentration in second region (mass %) | Fe concentration in second region (mass %) | Si concentration in second region (mass %) |
| Invention Example | B35 | A21 | 8.3 | 84 | 27 | 62 | 4 | 44 | 50 | 2 |
| | B36 | A21 | 9.2 | 95 | 30 | 61 | 6 | 46 | 48 | 3 |
| | B37 | A21 | 8.5 | 96 | 27 | 64 | 5 | 44 | 50 | 3 |
| | B38 | A22 | 8.5 | 97 | 24 | 64 | 8 | 41 | 52 | 2 |
| | B39 | A22 | 8.4 | 97 | 25 | 64 | 9 | 41 | 52 | 2 |
| | B40 | A22 | 8.7 | 87 | 24 | 63 | 9 | 40 | 53 | 3 |
| | B41 | A22 | 8.1 | 86 | 25 | 64 | 8 | 40 | 53 | 2 |
| | B42 | A22 | 9.1 | 96 | 27 | 62 | 9 | 43 | 51 | 3 |
| | B43 | A22 | 8.5 | 97 | 25 | 63 | 8 | 42 | 53 | 2 |
| | B44 | A23 | 8.7 | 97 | 29 | 61 | 5 | 43 | 50 | 3 |
| | B45 | A23 | 8.8 | 96 | 29 | 61 | 5 | 43 | 50 | 3 |
| | B46 | A23 | 9.0 | 88 | 28 | 62 | 5 | 43 | 51 | 2 |
| | B47 | A23 | 8.6 | 87 | 28 | 62 | 5 | 42 | 51 | 3 |
| | B48 | A23 | 9.5 | 97 | 31 | 60 | 6 | 45 | 49 | 3 |
| | B49 | A23 | 8.8 | 96 | 29 | 62 | 5 | 42 | 51 | 3 |
| | B50 | A24 | 9.2 | 97 | 27 | 63 | 5 | 42 | 50 | 3 |
| | B51 | A24 | 9.2 | 96 | 27 | 62 | 5 | 42 | 50 | 3 |
| | B52 | A24 | 9.4 | 92 | 26 | 63 | 4 | 43 | 50 | 2 |
| | B53 | A24 | 9.1 | 91 | 27 | 63 | 5 | 42 | 50 | 3 |
| | B54 | A24 | 9.8 | 96 | 29 | 62 | 6 | 45 | 49 | 3 |
| | B55 | A24 | 9.1 | 96 | 27 | 62 | 5 | 43 | 50 | 3 |
| | B56 | A25 | 10.1 | 96 | 28 | 63 | 4 | 42 | 50 | 3 |
| | B57 | A25 | 10.0 | 96 | 28 | 62 | 5 | 43 | 49 | 3 |
| | B58 | A25 | 10.5 | 88 | 27 | 63 | 5 | 42 | 50 | 3 |
| | B59 | A25 | 9.9 | 87 | 28 | 63 | 5 | 43 | 49 | 3 |
| | B60 | A25 | 10.6 | 95 | 30 | 61 | 6 | 45 | 48 | 3 |
| | B61 | A25 | 10.2 | 96 | 28 | 63 | 5 | 43 | 50 | 3 |
| | B62 | A26 | 8.6 | 97 | 25 | 64 | 9 | 41 | 52 | 2 |
| | B63 | A26 | 8.4 | 97 | 25 | 64 | 9 | 41 | 53 | 2 |
| | B64 | A26 | 8.7 | 88 | 25 | 63 | 9 | 40 | 53 | 3 |
| | B65 | A26 | 8.0 | 86 | 24 | 63 | 8 | 40 | 53 | 2 |
| | B66 | A26 | 9.0 | 96 | 27 | 63 | 9 | 43 | 51 | 3 |
| | B67 | A26 | 8.6 | 97 | 25 | 63 | 8 | 43 | 53 | 2 |

TABLE 2F

|  | Reference symbol | Steel No. | Joint component | | | | | |
|---|---|---|---|---|---|---|---|---|
|  |  |  | Mo concentration in first region (mass %) | Cu concentration in first region (mass %) | Ni concentration in first region (mass %) | Mo + Cu + Ni in first region (mass %) | Mo concentration in second region (mass %) | Cu concentration in second region (mass %) |
| Invention Example | B35 | A21 | 0.10 | 0.16 | 0.17 | 0.43 | 0.07 | 0.11 |
|  | B36 | A21 | 0.11 | 0.17 | 0.17 | 0.45 | 0.07 | 0.13 |
|  | B37 | A21 | 0.11 | 0.16 | 0.16 | 0.43 | 0.07 | 0.11 |
|  | B38 | A22 | 0.09 | 0.13 | 0.15 | 0.37 | 0.06 | 0.14 |
|  | B39 | A22 | 0.08 | 0.14 | 0.15 | 0.37 | 0.06 | 0.13 |
|  | B40 | A22 | 0.09 | 0.15 | 0.14 | 0.38 | 0.06 | 0.14 |
|  | B41 | A22 | 0.08 | 0.14 | 0.15 | 0.37 | 0.07 | 0.14 |
|  | B42 | A22 | 0.10 | 0.15 | 0.15 | 0.40 | 0.07 | 0.15 |
|  | B43 | A22 | 0.08 | 0.14 | 0.14 | 0.36 | 0.06 | 0.14 |
|  | B44 | A23 | 0.09 | 0.13 | 0.14 | 0.36 | 0.07 | 0.11 |
|  | B45 | A23 | 0.09 | 0.14 | 0.13 | 0.36 | 0.05 | 0.11 |
|  | B46 | A23 | 0.09 | 0.13 | 0.14 | 0.36 | 0.05 | 0.11 |
|  | B47 | A23 | 0.08 | 0.14 | 0.14 | 0.36 | 0.05 | 0.13 |
|  | B48 | A23 | 0.10 | 0.14 | 0.15 | 0.39 | 0.06 | 0.12 |
|  | B49 | A23 | 0.08 | 0.14 | 0.14 | 0.36 | 0.05 | 0.11 |
|  | B50 | A24 | 0.09 | 0.00 | 0.02 | 0.11 | 0.07 | 0.00 |
|  | B51 | A24 | 0.08 | 0.00 | 0.02 | 0.10 | 0.07 | 0.00 |
|  | B52 | A24 | 0.09 | 0.00 | 0.02 | 0.11 | 0.06 | 0.00 |
|  | B53 | A24 | 0.09 | 0.00 | 0.02 | 0.11 | 0.07 | 0.00 |
|  | B54 | A24 | 0.11 | 0.00 | 0.02 | 0.13 | 0.09 | 0.00 |
|  | B55 | A24 | 0.09 | 0.00 | 0.02 | 0.11 | 0.06 | 0.00 |
|  | B56 | A25 | 0.09 | 0.01 | 0.32 | 0.42 | 0.06 | 0.01 |
|  | B57 | A25 | 0.08 | 0.01 | 0.33 | 0.42 | 0.07 | 0.01 |
|  | B58 | A25 | 0.08 | 0.01 | 0.33 | 0.42 | 0.06 | 0.01 |
|  | B59 | A25 | 0.08 | 0.01 | 0.32 | 0.41 | 0.07 | 0.01 |
|  | B60 | A25 | 0.09 | 0.02 | 0.34 | 0.45 | 0.07 | 0.02 |
|  | B61 | A25 | 0.09 | 0.02 | 0.31 | 0.42 | 0.07 | 0.02 |
|  | B62 | A26 | 0.10 | 0.13 | 0.06 | 0.29 | 0.05 | 0.15 |
|  | B63 | A26 | 0.09 | 0.14 | 0.06 | 0.29 | 0.05 | 0.14 |
|  | B64 | A26 | 0.08 | 0.15 | 0.07 | 0.30 | 0.06 | 0.15 |
|  | B65 | A26 | 0.09 | 0.15 | 0.06 | 0.30 | 0.06 | 0.14 |
|  | B66 | A26 | 0.10 | 0.15 | 0.06 | 0.31 | 0.07 | 0.15 |
|  | B67 | A26 | 0.09 | 0.15 | 0.06 | 0.30 | 0.06 | 0.14 |

|  | Reference symbol | Steel No. | Joint component | | | | Cross-sectional area of filled metal after CCT (×10⁴ μm²) | Cross-sectional area decrease rate after CCT 360 cycles (%) |
|---|---|---|---|---|---|---|---|---|
|  |  |  | Ni concentration in second region (mass %) | Mo + Cu + Ni in second region (mass %) | Size of second region (μm) | CCT limit cycle (cyc) |  |  |
| Invention Example | B35 | A21 | 0.07 | 0.25 | 14 | 360 | 7.7 | 7 |
|  | B36 | A21 | 0.08 | 0.28 | 12 | 360 | 8.7 | 5 |
|  | B37 | A21 | 0.07 | 0.25 | 6 | 360 | 8.2 | 4 |
|  | B38 | A22 | 0.05 | 0.25 | 13 | 360 | 8.1 | 5 |
|  | B39 | A22 | 0.04 | 0.23 | 13 | 360 | 7.9 | 6 |
|  | B40 | A22 | 0.05 | 0.25 | 13 | 360 | 8.3 | 5 |
|  | B41 | A22 | 0.04 | 0.25 | 14 | 360 | 7.6 | 6 |
|  | B42 | A22 | 0.06 | 0.28 | 13 | 360 | 8.7 | 4 |
|  | B43 | A22 | 0.05 | 0.25 | 7 | 360 | 8.2 | 4 |
|  | B44 | A23 | 0.04 | 0.22 | 14 | 360 | 8.0 | 8 |
|  | B45 | A23 | 0.06 | 0.22 | 14 | 360 | 8.2 | 7 |
|  | B46 | A23 | 0.06 | 0.22 | 12 | 360 | 8.5 | 6 |
|  | B47 | A23 | 0.04 | 0.22 | 13 | 360 | 8.0 | 7 |
|  | B48 | A23 | 0.07 | 0.25 | 12 | 360 | 8.9 | 6 |
|  | B49 | A23 | 0.06 | 0.22 | 5 | 360 | 8.4 | 5 |
|  | B50 | A24 | 0.02 | 0.09 | 12 | 360 | 8.0 | 13 |
|  | B51 | A24 | 0.02 | 0.09 | 13 | 360 | 8.1 | 12 |
|  | B52 | A24 | 0.02 | 0.08 | 13 | 360 | 8.1 | 14 |
|  | B53 | A24 | 0.02 | 0.09 | 13 | 360 | 7.9 | 13 |
|  | B54 | A24 | 0.02 | 0.11 | 13 | 360 | 8.6 | 12 |
|  | B55 | A24 | 0.02 | 0.08 | 6 | 360 | 8.1 | 11 |
|  | B56 | A25 | 0.14 | 0.21 | 13 | 360 | 9.7 | 4 |
|  | B57 | A25 | 0.13 | 0.21 | 13 | 360 | 9.5 | 5 |
|  | B58 | A25 | 0.15 | 0.22 | 14 | 360 | 10.0 | 5 |

TABLE 2F-continued

| | | | | | | | |
|---|---|---|---|---|---|---|---|
| B59 | A25 | 0.13 | 0.21 | 13 | 360 | 9.3 | 6 |
| B60 | A25 | 0.15 | 0.24 | 12 | 360 | 10.1 | 5 |
| B61 | A25 | 0.13 | 0.22 | 8 | 360 | 9.8 | 4 |
| B62 | A26 | 0.02 | 0.22 | 13 | 360 | 8.0 | 4 |
| B63 | A26 | 0.02 | 0.21 | 12 | 360 | 8.0 | 5 |
| B64 | A26 | 0.03 | 0.24 | 13 | 360 | 8.2 | 5 |
| B65 | A26 | 0.03 | 0.23 | 13 | 360 | 7.7 | 6 |
| B66 | A26 | 0.02 | 0.24 | 13 | 360 | 8.8 | 5 |
| B67 | A26 | 0.02 | 0.22 | 7 | 360 | 8.3 | 4 |

TABLE 2G

| | Reference symbol | Steel No. | Coated steel sheet Al-based coating amount (g/m$^2$) | Heat treatment Temperature rising rate (° C./s) | Heating temperature (° C.) | Cooling rate (° C./s) | Steel member Al-Fe-based coating thickness (μm) | Tensile strength (MPa) | Spot-welding step Gap (μm) | Contact angle (degrees) | Electrode force (kgf) | Upslope (cyc) | Cooling rate (° C./s) |
|---|---|---|---|---|---|---|---|---|---|---|---|---|---|
| Comparative Example | b1 | a1 | 71 | 7 | 920 | 60 | 35 | 1465 | 60 | 0 | 400 | 10 | 750 |
| | b2 | a2 | 72 | 7 | 920 | 60 | 34 | 2852 | 60 | 0 | 400 | 10 | 750 |
| | b3 | a3 | 73 | 7 | 920 | 60 | 34 | 2604 | 60 | 0 | 400 | 10 | 750 |
| | b4 | a4 | 72 | 7 | 920 | 60 | 35 | 2190 | 60 | 0 | 400 | 10 | 750 |
| | b5 | a5 | 72 | 7 | 920 | 60 | 33 | 2292 | 60 | 0 | 400 | 10 | 750 |
| | b6 | a6 | 71 | 7 | 920 | 60 | 32 | 2480 | 60 | 0 | 400 | 10 | 750 |
| | b7 | a7 | 73 | 7 | 920 | 60 | 32 | 2448 | 60 | 0 | 400 | 10 | 750 |
| | b8 | a8 | 74 | 7 | 920 | 60 | 33 | 1374 | 60 | 0 | 400 | 10 | 750 |
| | b9 | a9 | 71 | 7 | 920 | 60 | 31 | 2356 | 60 | 0 | 400 | 10 | 750 |
| | b10 | a10 | 72 | 7 | 920 | 60 | 32 | 2308 | 60 | 0 | 400 | 10 | 750 |
| | b11 | a11 | 72 | 7 | 920 | 60 | 33 | 2399 | 60 | 0 | 400 | 10 | 750 |
| | b12 | A20 | 20 | 7 | 920 | 60 | 8 | 1880 | 60 | 0 | 400 | 10 | 750 |
| | b13 | A21 | 74 | 7 | 920 | 60 | 37 | 1956 | 5 | 0 | 400 | 10 | 750 |
| | b14 | A22 | 76 | 7 | 920 | 60 | 32 | 2114 | 1100 | 0 | 400 | 10 | 750 |
| | b15 | A23 | 78 | 7 | 920 | 60 | 37 | 2603 | 60 | 45 | 400 | 10 | 750 |
| | b16 | A24 | 77 | 7 | 920 | 60 | 38 | 2528 | 60 | 0 | 100 | 10 | 750 |
| | b17 | A25 | 79 | 7 | 920 | 60 | 38 | 2074 | 60 | 0 | 400 | 1 | 750 |
| | b18 | a2 | 72 | 1300 | 920 | 60 | 34 | 2882 | 60 | 0 | 400 | 10 | 750 |
| | b19 | a3 | 73 | 7 | 780 | 60 | 34 | 1392 | 60 | 0 | 400 | 10 | 750 |
| | b20 | a4 | 72 | 7 | 1200 | 60 | 35 | 2082 | 60 | 0 | 400 | 10 | 750 |
| | b21 | a5 | 72 | 7 | 920 | 1 | 33 | 1197 | 60 | 0 | 400 | 10 | 750 |
| | b22 | a6 | 71 | 1300 | 1200 | 60 | 32 | 2400 | 60 | 0 | 400 | 10 | 750 |
| | b23 | a7 | 73 | 7 | 780 | 1 | 32 | 1088 | 60 | 0 | 400 | 10 | 750 |
| | b24 | a9 | 71 | 7 | 920 | 60 | 31 | 2356 | 60 | 0 | 400 | 10 | 300 |
| | b25 | a10 | 72 | 7 | 920 | 60 | 32 | 2308 | 60 | 0 | 400 | 10 | 150 |
| | b26 | a11 | 72 | 7 | 920 | 60 | 33 | 2399 | 60 | 0 | 400 | 10 | 150 |

TABLE 2H

| | Reference symbol | Steel No. | Joint component Cross-sectional area of filled metal (×10$^4$ μm$^2$) | Filling ratio (%) | Al concentration in first region (mass %) | Fe concentration in first region (mass %) | Si concentration in first region (mass %) | Al concentration in second region (mass %) | Fe concentration in second region (mass %) | Si concentration in second region (mass %) |
|---|---|---|---|---|---|---|---|---|---|---|
| Comparative Example | b1 | a1 | 7.3 | 96 | 22 | 70 | 5 | 41 | 53 | 3 |
| | b2 | a2 | 7.3 | 96 | 26 | 65 | 6 | 40 | 54 | 2 |
| | b3 | a3 | 7.3 | 96 | 25 | 66 | 6 | 43 | 52 | 2 |
| | b4 | a4 | 8.1 | 95 | 28 | 63 | 6 | 42 | 52 | 3 |
| | b5 | a5 | 7.3 | 95 | 23 | 67 | 7 | 41 | 53 | 3 |
| | b6 | a6 | 8.4 | 95 | 24 | 65 | 8 | 42 | 53 | 2 |
| | b7 | a7 | 8.9 | 96 | 21 | 69 | 7 | 40 | 54 | 3 |
| | b8 | a8 | 8.5 | 95 | 21 | 70 | 6 | 40 | 54 | 3 |
| | b9 | a9 | 9.0 | 95 | 22 | 68 | 7 | 39 | 54 | 3 |
| | b10 | a10 | 8.2 | 96 | 21 | 70 | 6 | 40 | 54 | 2 |
| | b11 | a11 | 7.8 | 96 | 20 | 70 | 7 | 39 | 54 | 3 |
| | b12 | A20 | 0.9 | 85 | 28 | 63 | 6 | 41 | 53 | 3 |
| | b13 | A21 | 1.1 | 83 | 28 | 64 | 5 | 44 | 50 | 3 |
| | b14 | A22 | 12.1 | 45 | 27 | 64 | 6 | 43 | 51 | 3 |

TABLE 2H-continued

| | | Joint component | | | | | | | |
|---|---|---|---|---|---|---|---|---|---|
| Reference symbol | Steel No. | Cross-sectional area of filled metal (×10⁴ μm²) | Filling ratio (%) | Al concentration in first region (mass %) | Fe concentration in first region (mass %) | Si concentration in first region (mass %) | Al concentration in second region (mass %) | Fe concentration in second region (mass %) | Si concentration in second region (mass %) |
| b15 | A23 | 4.2 | 40 | 26 | 65 | 6 | 42 | 53 | 2 |
| b16 | A24 | 1.8 | 84 | 27 | 63 | 7 | 42 | 52 | 3 |
| b17 | A25 | 3.9 | 85 | 9 | 87 | 1 | 20 | 77 | 0 |
| b18 | a2 | 7.3 | 96 | 26 | 65 | 6 | 40 | 54 | 2 |
| b19 | a3 | 7.3 | 96 | 25 | 66 | 6 | 43 | 52 | 2 |
| b20 | a4 | 8.1 | 95 | 28 | 63 | 6 | 42 | 52 | 3 |
| b21 | a5 | 7.3 | 95 | 23 | 67 | 7 | 41 | 53 | 3 |
| b22 | a6 | 8.4 | 95 | 24 | 65 | 8 | 42 | 53 | 2 |
| b23 | a7 | 8.9 | 96 | 21 | 69 | 7 | 40 | 54 | 3 |
| b24 | a9 | 9.0 | 95 | 22 | 68 | 7 | 39 | 54 | 3 |
| b25 | a10 | 8.2 | 96 | 21 | 70 | 6 | 40 | 54 | 2 |
| b26 | a11 | 7.8 | 96 | 20 | 70 | 7 | 39 | 54 | 3 |

TABLE 2I

| | | | Joint component | | | | | |
|---|---|---|---|---|---|---|---|---|
| | Reference symbol | Steel No. | Mo concentration in first region (mass %) | Cu concentration in first region (mass %) | Ni concentration in first region (mass %) | Mo + Cu + Ni in first region (mass %) | Mo concentration in second region (mass %) | Cu concentration in second region (mass %) |
| Comparative Example | b1 | a1 | 0.00 | 0.12 | 0.00 | 0.12 | 0.00 | 0.10 |
| | b2 | a2 | 0.00 | 0.00 | 0.00 | 0.00 | 0.00 | 0.00 |
| | b3 | a3 | 0.00 | 0.00 | 0.00 | 0.00 | 0.00 | 0 00 |
| | b4 | a4 | 0.00 | 0.00 | 0.24 | 0.24 | 0.00 | 0.00 |
| | b5 | a5 | 0.00 | 0.00 | 0.00 | 0.00 | 0.00 | 0.00 |
| | b6 | a6 | 0.16 | 0.00 | 0.00 | 0.16 | 0.11 | 0.00 |
| | b7 | a7 | 0.00 | 0.00 | 0.22 | 0.22 | 0.00 | 0.00 |
| | b8 | a8 | 0.06 | 0.00 | 0.00 | 0.06 | 0.05 | 0.00 |
| | b9 | a9 | 0.00 | 0.00 | 0.00 | 0.00 | 0.00 | 0 00 |
| | b10 | a10 | 0.81 | 0.00 | 0.00 | 0.81 | 0.55 | 0.00 |
| | b11 | a11 | 0.00 | 0.00 | 1.65 | 1.65 | 0.00 | 0.00 |
| | b12 | A20 | 0.00 | 0.01 | 0.02 | 0.03 | 0.01 | 0.02 |
| | b13 | A21 | 0.10 | 0.13 | 0.17 | 0.40 | 0.07 | 0.12 |
| | b14 | A22 | 0.08 | 0.14 | 0.13 | 0.35 | 0.07 | 0.11 |
| | b15 | A23 | 0.10 | 0.14 | 0.14 | 0.38 | 0.07 | 0.11 |
| | b16 | A24 | 0.09 | 0.00 | 0.03 | 0.12 | 0.07 | 0.00 |
| | b17 | A25 | 0.04 | 0.01 | 0.09 | 0.14 | 0.01 | 0.01 |
| | b18 | a2 | 0.00 | 0.00 | 0.00 | 0.00 | 0.00 | 0.00 |
| | b19 | a3 | 0.00 | 0.00 | 0.00 | 0.00 | 0.00 | 0.00 |
| | b20 | a4 | 0.00 | 0.00 | 0.24 | 0.24 | 0.00 | 0.00 |
| | b21 | a5 | 0.00 | 0.00 | 0.00 | 0.00 | 0.00 | 0.00 |
| | b22 | a6 | 0.16 | 0.00 | 0.00 | 0.16 | 0.11 | 0.00 |
| | b23 | a7 | 0.00 | 0.00 | 0.22 | 0.22 | 0.00 | 0.00 |
| | b24 | a9 | 0.00 | 0.00 | 0.00 | 0.00 | 0.00 | 0.00 |
| | b25 | a10 | 0.81 | 0.00 | 0.00 | 0.81 | 0.55 | 0.00 |
| | b26 | a11 | 0.00 | 0.00 | 1.65 | 1.65 | 0.00 | 0.00 |

| | | | Joint component | | | | | |
|---|---|---|---|---|---|---|---|---|
| | Reference symbol | Steel No. | Ni concentration in second region (mass %) | Mo + Cu + Ni in second region (mass %) | Size of second region (μm) | CCT limit cycle (cyc) | Cross-sectional area of filled metal after CCT (×10⁴ μm²) | Cross-sectional area decrease rate after CCT 360 cycles (%) |
| Comparative Example | b1 | a1 | 0.00 | 0.10 | 20 | 360 | 6.2 | 15 |
| | b2 | a2 | 0.00 | 0.00 | 18 | 159 | — | — |

TABLE 2I-continued

| | | | | | | | |
|---|---|---|---|---|---|---|---|
| b3 | a3 | 0.00 | 0.00 | 17 | 180 | — | — |
| b4 | a4 | 0.11 | 0.11 | 18 | 180 | — | — |
| b5 | a5 | 0.00 | 0.00 | 18 | 183 | — | — |
| b6 | a6 | 0.00 | 0.11 | 17 | 192 | — | — |
| b7 | a7 | 0.09 | 0.09 | 18 | 270 | — | — |
| b8 | a8 | 0.00 | 0.05 | 21 | 360 | 6.9 | 19 |
| b9 | a9 | 0.00 | 0.00 | 24 | 276 | — | — |
| b10 | a10 | 0.00 | 0.55 | 21 | 261 | — | — |
| b11 | a11 | 0.64 | 0.64 | 20 | 252 | — | — |
| b12 | A20 | 0.00 | 0.03 | 19 | 243 | — | — |
| b13 | A21 | 0.07 | 0.26 | 22 | 303 | — | — |
| b14 | A22 | 0.05 | 0.23 | 23 | 282 | — | — |
| b15 | A23 | 0.05 | 0.23 | 23 | 225 | — | — |
| b16 | A24 | 0.02 | 0.09 | 22 | 219 | — | — |
| b17 | A25 | 0.04 | 0.06 | 21 | 267 | — | — |
| b18 | a2 | 0.00 | 0.00 | 18 | 129 | — | — |
| b19 | a3 | 0.00 | 0.00 | 17 | 360 | 6.0 | 18 |
| b20 | a4 | 0.11 | 0.11 | 18 | 156 | — | — |
| b21 | a5 | 0.00 | 0.00 | 18 | 360 | 6.1 | 16 |
| b22 | a6 | 0.00 | 0.11 | 17 | 171 | — | — |
| b23 | a7 | 0.09 | 0.09 | 18 | 360 | 7.2 | 19 |
| b24 | a9 | 0.00 | 0.00 | 38 | 210 | — | — |
| b25 | a10 | 0.00 | 0.55 | 48 | 207 | — | — |
| b26 | a11 | 0.64 | 0.64 | 52 | 201 | — | — |

As shown in Table 2A to Table 2I, Invention Examples B1 to B67 that satisfied the scope of the present invention showed good results in terms of both structure and properties; however, in Comparative Examples b1 to b26 that did not satisfy the scope of the present invention, the chemical compositions or the formation of the filled metal was insufficient, and at least one of strength (the strength of the steel member that served as a material) and the hydrogen embrittlement resistance was poor. Furthermore, when the filled metal contained Mo, Cu and Ni, the hydrogen embrittlement resistance was excellent particularly in a corrosive environment.

INDUSTRIAL APPLICABILITY

According to the present invention, it becomes possible to obtain a high-strength joint component having a spot-welded portion having excellent hydrogen embrittlement resistance in a corrosive environment. The joint component according to the present invention is particularly suitable for use as a vehicle frame component. Since the steel member of the present invention has high strength and excellent hydrogen embrittlement resistance, the steel member contributes to improvement in fuel consumption and collision safety when being applied to a vehicle component.

BRIEF DESCRIPTION OF THE REFERENCE SYMBOLS

1: Joint component
11: First steel member
12: Second steel member
21: Spot-welded portion
31: Filled metal
111: Steel sheet substrate
112: Al—Fe-based coating
g: Gap

The invention claimed is:
1. A joint component comprising:
a first steel member;
a second steel member; and
a spot-welded portion that joins the first steel member and the second steel member,
wherein the first steel member includes a steel sheet substrate containing, as a chemical composition, by mass %,
C: 0.25% to 0.65%,
Si: 0.10% to 1.00%,
Mn: 0.30% to 1.50%,
P: 0.050% or less,
S: 0.0100% or less,
N: 0.010% or less,
Ti: 0.010% to 0.100%,
B: 0.0005% to 0.0100%,
Mo: 0% to 1.00%,
Cu: 0% to 1.00%,
Ni: 0% to 1.00%,
Cr: 0% to 1.00%,
Nb: 0% to 0.10%,
V: 0% to 1.00%,
Ca: 0% to 0.010%,
Al: 0% to 1.00%,
Sn: 0% to 1.00%,
W: 0% to 1.00%,
Sb: 0% to 1.00%,
Zr: 0% to 1.00%,
REM: 0% to 0.30%, and
a remainder of Fe and an impurity; and
a coating that is formed on a surface of the steel sheet substrate, contains Al and Fe, and has a thickness of 25 μm or more,
in a cross section in a thickness direction of the first steel member and the second steel member including the spot-welded portion, a filled metal containing Al and Fe is present in a gap between the first steel member and the second steel member in a periphery of the spot-welded portion,
in the cross section, the filled metal has a cross-sectional area of $3.0 \times 10^4$ μm$^2$ or more, and a filling ratio of 80% or more in the gap in a range of 100 μm from an end portion of a corona bond formed in the periphery of the spot-welded portion, and
the filled metal includes a first region containing, by mass %, Al: 15% or more and less than 35%, Fe: 55% or more and 75% or less, and Si: 4% or more and 9% or less and a second region containing, by mass %, Al:

35% or more and 55% or less, Fe: 40% or more and less than 55%, and Si: 1% or more and less than 4%.

2. The joint component according to claim 1,
wherein the steel sheet substrate of the first steel member contains, as the chemical composition, by mass %, one or more of Mo: 0.10% to 1.00%, Cu: 0.10% to 1.00%, and Ni: 0.10% to 1.00%,
the first region further contains one or more of Mo, Cu, and Ni in a total content of 0.25% or more, and
the second region further contains one or more of Mo, Cu, and Ni in a total content of 0.15% or more.

3. The joint component according to claim 2,
wherein an average of Feret diameters of the second region is 30 µm or less.

4. A manufacturing method of a joint component according to claim 1, the method comprising:
a heat treatment step of heating a coated steel sheet including a steel sheet containing, as a chemical composition, by mass %, C: 0.25% to 0.65%, Si: 0.10% to 1.00%, Mn: 0.30% to 1.50%, P: 0.050% or less, S: 0.0100% or less, N: 0.010% or less, Ti: 0.010% to 0.100%, B: 0.0005% to 0.0100%, Mo: 0% to 1.00%, Cu: 0% to 1.00%, Ni: 0% to 1.00%, Cr: 0% to 1.00%, Nb: 0% to 0.10%, V: 0% to 1.00%, Ca: 0% to 0.010%, Al: 0% to 1.00%, Sn: 0% to 1.00%, W: 0% to 1.00%, Sb: 0% to 1.00%, Zr: 0% to 1.00%, REM: 0% to 0.30%, and a remainder of Fe and an impurity and a coating that is formed on a surface of the steel sheet, contains Al, and has an adhesion amount of 50 g/m² or more to an Ac3 point to (Ac3 point+300° C.) at a temperature rising rate of 1.0 to 1,000° C./s and cooling the coated steel sheet to an Ms point or lower at an upper critical cooling rate or faster to obtain a first steel member; and
a spot-welding step of joining the first steel member after the heat treatment step and a second steel member that serves as an opposite material by spot welding,
wherein, in the spot-welding step,
at least at a position where an energizing electrode is pressed, the first steel member and the second steel member are disposed so as to overlap each other with a gap of 50 µm to 500 µm therebetween, and
the energizing electrode is pressed against the first steel member and the second steel member such that a contact angle is 15 degrees or less and an electrode force is 300 kgf or more, 5 or more cycles of upslope in which an energizing amount is gradually increased is imparted with a 50 Hz or 60 Hz alternating source, and then a weld nugget is formed to join the first steel member and the second steel member.

5. The manufacturing method of a joint component according to claim 4,
wherein the steel sheet contains, as the chemical composition, by mass %, one or more of Mo: 0.10% to 1.00%, Cu: 0.10% to 1.00%, and Ni: 0.10% to 1.00%.

6. The manufacturing method of a joint component according to claim 5,
wherein, in the spot-welding step, an average cooling rate from 800° C. to 500° C. is set to 500° C./s or faster.

* * * * *